(12) United States Patent
Hermanson et al.

(10) Patent No.: US 9,597,240 B2
(45) Date of Patent: Mar. 21, 2017

(54) VEHICLE ACCESSIBILITY SYSTEM

(71) Applicant: THE BRAUN CORPORATION, Winamac, IN (US)

(72) Inventors: Jeffrey J. Hermanson, Culver, IN (US); Aaron E. Kiser, Royal Center, IN (US); Justin Kline, Winamac, IN (US)

(73) Assignee: THE BRAUN CORPORATION, Winamac, IN (US)

( * ) Notice: Subject to any disclaimer, the term of this patent is extended or adjusted under 35 U.S.C. 154(b) by 157 days.

(21) Appl. No.: 14/292,463

(22) Filed: May 30, 2014

(65) Prior Publication Data

US 2014/0356116 A1 Dec. 4, 2014

Related U.S. Application Data

(60) Provisional application No. 61/829,154, filed on May 30, 2013.

(51) Int. Cl.
*B60P 1/43* (2006.01)
*A61G 3/06* (2006.01)
*A61G 3/08* (2006.01)

(52) U.S. Cl.
CPC ........... *A61G 3/061* (2013.01); *A61G 3/0808* (2013.01); *B60P 1/43* (2013.01); *B60P 1/433* (2013.01); *B60P 1/435* (2013.01); *Y10S 414/134* (2013.01)

(58) Field of Classification Search
CPC .. B60P 1/43; B60P 1/433; B60P 1/435; A61G 3/061; E01D 1/00
See application file for complete search history.

(56) References Cited

U.S. PATENT DOCUMENTS

| 5,026,225 A | 6/1991 | McIntyre |
| 5,137,413 A * | 8/1992 | Ressler ...................... B60P 1/43 |
| | | 414/537 |

(Continued)

FOREIGN PATENT DOCUMENTS

| EP | 2564824 A2 | 3/2013 | |
| FR | 2598362 A1 * | 11/1987 | ............. A61G 3/061 |

(Continued)

OTHER PUBLICATIONS

MobilityWorks Commercial, Flex Flat Ramp System, known and accessible to the public at least prior to May 30, 2013, retrieved from the Internet at: http://www.mobilityworks.com/Commercial/flexflatramp.php (1 page).

(Continued)

*Primary Examiner* — James Keenan
(74) *Attorney, Agent, or Firm* — Michael Best & Friedrich LLP

(57) ABSTRACT

An accessibility system for providing access into or out of a vehicle includes a pan defining a securement area. The pan includes a first end, a second end, and a support surface. A ramp assembly includes a first segment and a second segment hingedly coupled to the first segment. The ramp assembly is pivotally coupled to and deployable from the pan near the second end. A tailgate assembly is detachably secured and pivotally coupled to the pan such that during deployment of the ramp assembly, the ramp assembly is pivotable about a first axis and the tailgate assembly is pivotable about a second axis parallel to and offset from the first axis.

10 Claims, 19 Drawing Sheets

(56) References Cited

U.S. PATENT DOCUMENTS

| | | | |
|---|---|---|---|
| 5,618,151 A | 4/1997 | Rosenkranz | |
| 5,632,593 A | 5/1997 | Aoki | |
| 5,678,932 A | 10/1997 | Cohn | |
| 5,803,615 A | 9/1998 | Cohn | |
| 5,865,593 A | 2/1999 | Cohn | |
| 5,888,038 A | 3/1999 | Ditch et al. | |
| 6,010,298 A | 1/2000 | Cohn et al. | |
| 6,039,528 A | 3/2000 | Cohn | |
| RE36,805 E | 8/2000 | Kempf | |
| 6,095,747 A | 8/2000 | Cohn | |
| 6,186,733 B1 | 2/2001 | Lewis et al. | |
| 6,203,265 B1 | 3/2001 | Cohn et al. | |
| 6,210,098 B1 | 4/2001 | Cohn et al. | |
| 6,238,168 B1 | 5/2001 | Cohn et al. | |
| 6,276,732 B1 | 8/2001 | Hauss | |
| 6,340,280 B1 | 1/2002 | Mollick et al. | |
| 6,343,908 B1* | 2/2002 | Oudsten | A61G 3/061 414/537 |
| 6,378,927 B1* | 4/2002 | Parry-Jones | B60P 1/435 296/61 |
| 6,406,230 B1 | 6/2002 | Mason et al. | |
| 6,409,458 B1 | 6/2002 | Cohn et al. | |
| 6,524,039 B1 | 2/2003 | Magnuson et al. | |
| 6,602,041 B2 | 8/2003 | Lewis et al. | |
| 6,698,998 B2* | 3/2004 | Koretsky | A61G 3/061 414/537 |
| 6,843,635 B2 | 1/2005 | Cohn | |
| 6,872,037 B2 | 3/2005 | Girardin | |
| 6,899,497 B2 | 5/2005 | Cardona et al. | |
| 6,971,834 B2 | 12/2005 | Morris | |
| 7,001,132 B2* | 2/2006 | Koretsky | A61G 3/061 414/537 |
| 7,326,024 B2 | 2/2008 | Cohn et al. | |
| 7,384,232 B2 | 6/2008 | Morris | |
| 7,500,818 B1 | 3/2009 | Johnson | |
| 7,533,432 B2 | 5/2009 | Morris et al. | |
| 7,533,433 B2 | 5/2009 | Morris et al. | |
| 7,533,434 B2 | 5/2009 | Morris et al. | |
| 7,681,272 B2 | 3/2010 | Morris et al. | |
| 7,766,127 B2 | 8/2010 | Morris et al. | |
| 7,870,630 B2 | 1/2011 | Johnson | |
| 7,870,631 B2 | 1/2011 | Morris et al. | |
| 7,896,134 B2 | 3/2011 | Morris et al. | |
| 7,913,341 B1* | 3/2011 | Morris | A61G 3/061 14/71.1 |
| 7,913,342 B1 | 3/2011 | Morris et al. | |
| 7,913,343 B1 | 3/2011 | Cohn | |
| 8,020,234 B2 | 9/2011 | Johnson et al. | |
| 8,032,963 B2 | 10/2011 | Morris et al. | |
| 8,122,552 B2 | 2/2012 | Morris et al. | |
| 8,122,553 B1 | 2/2012 | Johnson et al. | |
| 8,132,281 B1 | 3/2012 | Johnson et al. | |
| 8,166,594 B1 | 5/2012 | Morris | |
| 8,181,300 B1 | 5/2012 | Johnson et al. | |
| 8,215,020 B1 | 7/2012 | Johnson | |
| 8,230,539 B2 | 7/2012 | Morris et al. | |
| 8,234,737 B2 | 8/2012 | Morris et al. | |
| 8,240,053 B1 | 8/2012 | Johnson | |
| 8,250,693 B1 | 8/2012 | Johnson et al. | |
| 8,286,754 B2 | 10/2012 | Cohn | |
| 8,302,235 B1 | 11/2012 | Bailie et al. | |
| 8,313,088 B2 | 11/2012 | Thompson | |
| 8,327,485 B1 | 12/2012 | Morris et al. | |
| 8,327,486 B2* | 12/2012 | Fontaine | A61G 3/061 14/69.5 |
| 8,332,981 B2 | 12/2012 | Woo et al. | |
| 8,359,691 B2 | 1/2013 | Morris et al. | |
| 8,375,496 B1 | 2/2013 | Johnson et al. | |
| 8,382,539 B2 | 2/2013 | Richeux et al. | |
| 8,397,329 B2 | 3/2013 | Just et al. | |
| 8,398,356 B2 | 3/2013 | Sandoz | |
| 8,402,660 B1 | 3/2013 | Johnson et al. | |
| 8,413,280 B2 | 4/2013 | Goin et al. | |
| 8,424,254 B2 | 4/2013 | Ballester | |
| 8,434,181 B1 | 5/2013 | Johnson et al. | |
| 8,438,683 B1 | 5/2013 | Morris et al. | |
| 8,448,383 B2 | 5/2013 | Bode | |
| 8,479,337 B1 | 7/2013 | Morris | |
| 8,505,141 B1 | 8/2013 | Morris et al. | |
| 8,511,734 B2 | 8/2013 | Hutchins, Jr. et al. | |
| 8,517,659 B2 | 8/2013 | Koretsky et al. | |
| 8,523,508 B2 | 9/2013 | Hurler | |
| 8,533,884 B1 | 9/2013 | Johnson et al. | |
| 8,534,979 B2 | 9/2013 | Hansen | |
| 8,540,214 B2 | 9/2013 | Christian | |
| 8,555,443 B2 | 10/2013 | Couto et al. | |
| 8,561,238 B1 | 10/2013 | Inget | |
| 8,562,279 B2 | 10/2013 | Beck et al. | |
| 8,578,536 B1 | 11/2013 | Morris | |
| 8,590,159 B1 | 11/2013 | Johnson et al. | |
| 8,621,696 B1 | 1/2014 | Morris | |
| 8,628,099 B2 | 1/2014 | Gregory et al. | |
| 8,631,528 B1 | 1/2014 | Johnson | |
| 8,635,729 B1 | 1/2014 | Johnson et al. | |
| D706,513 S | 6/2014 | LaBarbera et al. | |
| 8,739,341 B1 | 6/2014 | Morris | |
| 8,739,935 B2 | 6/2014 | Zuercher et al. | |
| 8,745,800 B1 | 6/2014 | Morris | |
| 8,763,186 B2 | 7/2014 | Mosey et al. | |
| 8,764,088 B1 | 7/2014 | Jobe | |
| 8,764,372 B2 | 7/2014 | Fletcher et al. | |
| 8,769,823 B1 | 7/2014 | Johnson et al. | |
| 8,770,645 B2 | 7/2014 | Bruns | |
| 8,782,840 B2 | 7/2014 | Saucier | |
| 8,783,701 B1 | 7/2014 | Blevins | |
| 8,789,888 B2 | 7/2014 | Tscherbner et al. | |
| 8,800,087 B2 | 8/2014 | Couto et al. | |
| 8,800,582 B2 | 8/2014 | Hooper et al. | |
| 8,813,289 B1 | 8/2014 | Clark et al. | |
| 8,813,290 B1 | 8/2014 | Morris | |
| 8,816,225 B2 | 8/2014 | Deleo et al. | |
| 8,832,890 B2 | 9/2014 | Loftis et al. | |
| 8,832,892 B2 | 9/2014 | Goin et al. | |
| 8,832,893 B1 | 9/2014 | Morris et al. | |
| 8,869,333 B2 | 10/2014 | Johnson et al. | |
| 8,887,337 B1 | 11/2014 | Morris et al. | |
| 8,926,254 B2 | 1/2015 | Pocobello et al. | |
| 8,938,837 B1 | 1/2015 | Johnson et al. | |
| 8,998,558 B2 | 4/2015 | Kitchin et al. | |
| 9,056,038 B1 | 6/2015 | Schmidt et al. | |
| 9,061,612 B2 | 6/2015 | de Bijl et al. | |
| 9,079,524 B2 | 7/2015 | Aucoin | |
| 9,095,482 B2 | 8/2015 | Gressett et al. | |
| 9,289,337 B2 | 3/2016 | Fritsche et al. | |
| 9,333,132 B2 | 5/2016 | Bruestle et al. | |
| 2001/0005478 A1 | 6/2001 | Lewis et al. | |
| 2001/0008606 A1 | 7/2001 | Lewis et al. | |
| 2001/0038787 A1* | 11/2001 | Beck | A61G 3/061 414/537 |
| 2001/0043853 A1 | 11/2001 | Lewis et al. | |
| 2001/0048870 A1 | 12/2001 | Lewis et al. | |
| 2001/0049908 A1 | 12/2001 | Cohn et al. | |
| 2002/0057960 A1 | 5/2002 | Cohn et al. | |
| 2002/0197141 A1 | 12/2002 | Cohn | |
| 2003/0007853 A1 | 1/2003 | Cohn et al. | |
| 2003/0213653 A1 | 11/2003 | Morris | |
| 2004/0057823 A1 | 3/2004 | Morris | |
| 2004/0094365 A1 | 5/2004 | Morris | |
| 2004/0136820 A1 | 7/2004 | Cohn | |
| 2005/0179269 A1* | 8/2005 | Weiland | B60P 1/43 293/149 |
| 2007/0207020 A1 | 9/2007 | Samuels et al. | |
| 2008/0017455 A1 | 1/2008 | Cohn et al. | |
| 2008/0101905 A1 | 5/2008 | Morris et al. | |
| 2008/0121467 A1 | 5/2008 | Morris et al. | |
| 2008/0187425 A1* | 8/2008 | Morris | A61G 3/061 414/537 |
| 2008/0271266 A1 | 11/2008 | Johnson | |
| 2008/0271267 A1 | 11/2008 | Morris et al. | |
| 2008/0271268 A1 | 11/2008 | Johnson | |
| 2008/0271269 A1 | 11/2008 | Morris et al. | |
| 2008/0273956 A1 | 11/2008 | Morris et al. | |
| 2008/0283340 A1 | 11/2008 | Cohn | |

(56) References Cited

U.S. PATENT DOCUMENTS

| | | | |
|---|---|---|---|
| 2009/0035111 A1 | 2/2009 | Morris et al. | |
| 2009/0035112 A1 | 2/2009 | Morris et al. | |
| 2009/0035113 A1 | 2/2009 | Morris et al. | |
| 2009/0087278 A1 | 4/2009 | Girardin et al. | |
| 2009/0255067 A1* | 10/2009 | Budd | A61G 3/061 14/71.1 |
| 2009/0271934 A1* | 11/2009 | Morris | A61G 3/061 14/71.3 |
| 2009/0274542 A1* | 11/2009 | Pocobello | A61G 3/0808 414/522 |
| 2011/0023246 A1 | 2/2011 | Morris et al. | |
| 2011/0027054 A1* | 2/2011 | Hansen | A61G 3/061 414/523 |
| 2011/0072598 A1 | 3/2011 | Morris et al. | |
| 2011/0088174 A1 | 4/2011 | Morris et al. | |
| 2011/0088175 A1 | 4/2011 | Morris et al. | |
| 2011/0088176 A1 | 4/2011 | Cohn | |
| 2011/0088177 A1 | 4/2011 | Johnson et al. | |
| 2011/0088179 A1 | 4/2011 | Morris et al. | |
| 2012/0233787 A1 | 9/2012 | Couto et al. | |
| 2012/0259544 A1 | 10/2012 | Watson, II et al. | |
| 2012/0279417 A1 | 11/2012 | Charbonneau | |
| 2012/0297558 A1 | 11/2012 | Wang et al. | |
| 2013/0045069 A1 | 2/2013 | Day | |
| 2013/0055511 A1 | 3/2013 | McGivern et al. | |
| 2013/0074686 A1 | 3/2013 | Serpeault | |
| 2013/0134733 A1 | 5/2013 | Peters | |
| 2013/0136567 A1 | 5/2013 | Hambardzumyan | |
| 2013/0168165 A1 | 7/2013 | Bartel et al. | |
| 2013/0174359 A1 | 7/2013 | Morris et al. | |
| 2013/0219637 A1 | 8/2013 | Goin et al. | |
| 2013/0229027 A1 | 9/2013 | Copp et al. | |
| 2013/0276247 A1 | 10/2013 | Saucier et al. | |
| 2013/0294873 A1 | 11/2013 | Chastain, Jr. | |
| 2013/0330157 A1 | 12/2013 | Asztalos et al. | |
| 2014/0123411 A1 | 5/2014 | Mosey et al. | |
| 2014/0124337 A1 | 5/2014 | Murphy | |
| 2014/0199144 A9 | 7/2014 | Asztalos et al. | |
| 2014/0216838 A1 | 8/2014 | Avigad et al. | |
| 2014/0219753 A1 | 8/2014 | Alasfour | |
| 2014/0219756 A1* | 8/2014 | Smith | A61G 3/061 414/537 |
| 2014/0231175 A1 | 8/2014 | Mueller | |
| 2014/0245548 A1 | 9/2014 | Johnson et al. | |
| 2014/0248109 A1 | 9/2014 | Johnson et al. | |
| 2014/0255138 A1* | 9/2014 | Bruns | A61G 3/061 414/537 |
| 2014/0353948 A1 | 12/2014 | Hermanson | |
| 2014/0356090 A1 | 12/2014 | Cardona | |
| 2014/0369778 A1 | 12/2014 | Hermanson et al. | |
| 2015/0013082 A1 | 1/2015 | Fisher et al. | |
| 2015/0052693 A1 | 2/2015 | Allen | |
| 2015/0314720 A1 | 11/2015 | Aucoin | |
| 2015/0328067 A1 | 11/2015 | Girardin et al. | |
| 2016/0095767 A1 | 4/2016 | Smith et al. | |

FOREIGN PATENT DOCUMENTS

| | | | |
|---|---|---|---|
| JP | 2004097364 A | 4/2004 | |
| JP | 2011062351 A | 3/2011 | |
| JP | 2012205746 A | 10/2012 | |
| WO | WO 9852787 A1 * | 11/1998 | A61G 3/061 |
| WO | WO 2009126627 A1 * | 10/2009 | A61G 3/061 |
| WO | WO 2010/003387 A1 * | 1/2010 | A61G 3/061 |
| WO | 2011044699 A1 | 4/2011 | |

OTHER PUBLICATIONS

International Search Report and Written Opinion received in International Patent Application No. PCT/US2014/040350, dialed Nov. 6, 2014 (14 pages).

International Search Report and Written Opinion received in International Patent Application No. PCT/US2014/0000096, dialed Nov. 17, 2014 (13 pages).

* cited by examiner

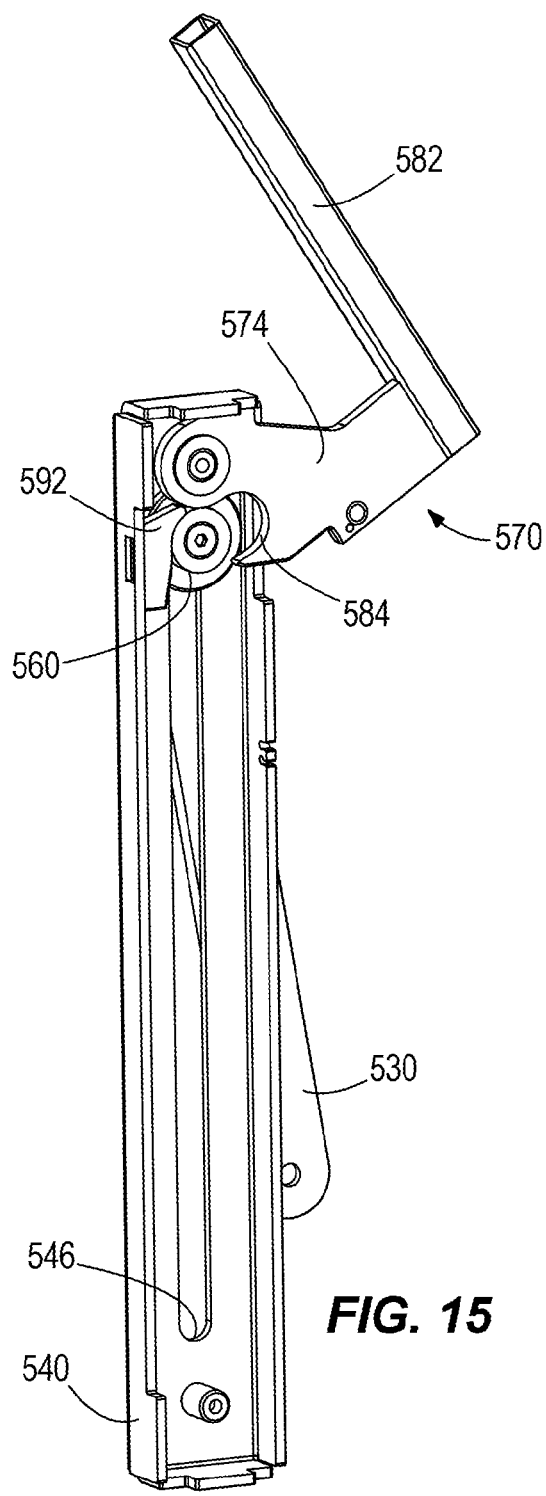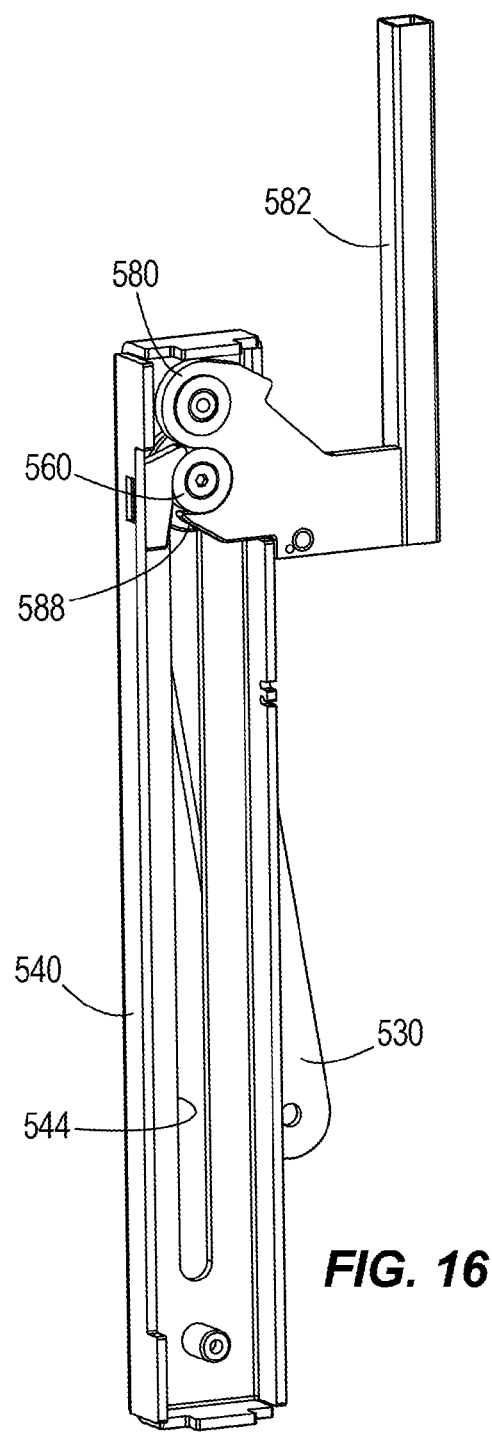
FIG. 15
FIG. 16

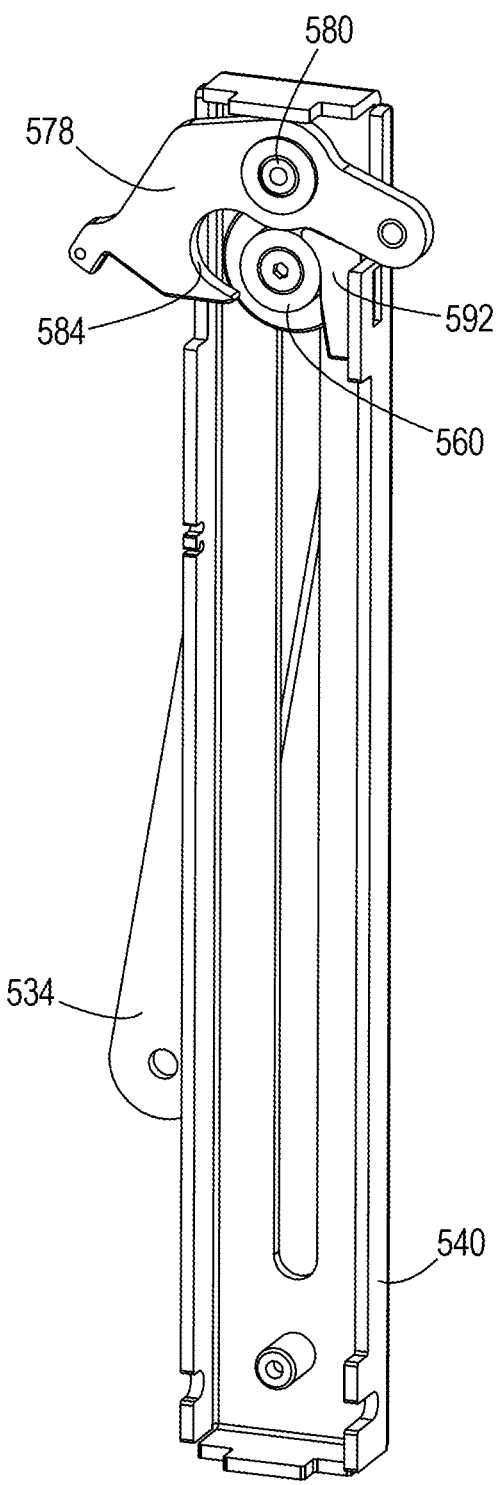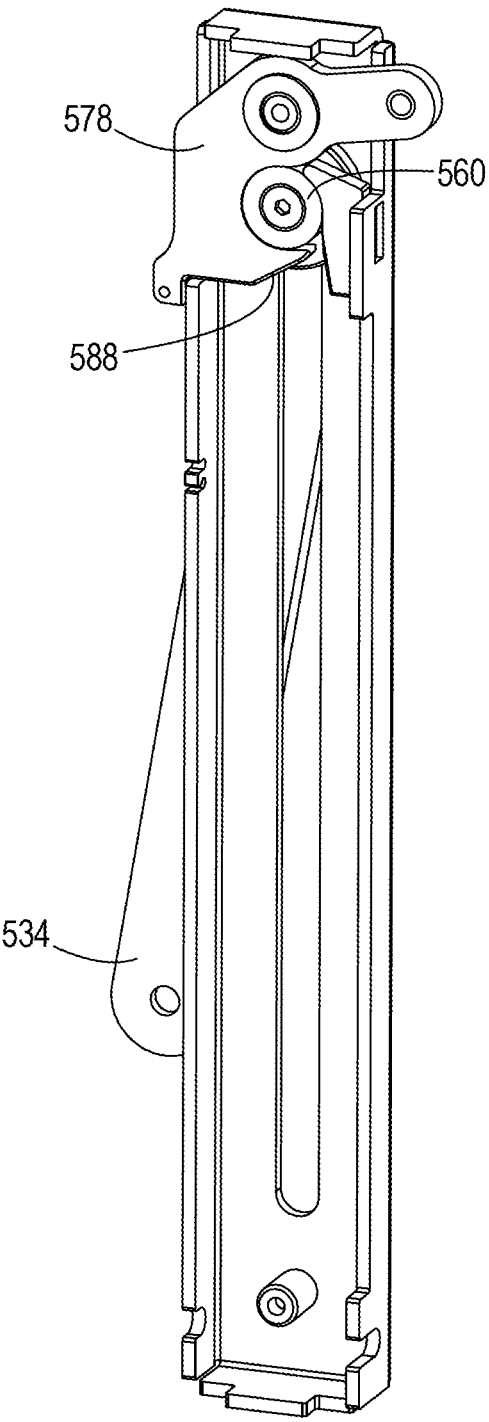
FIG. 17
FIG. 18

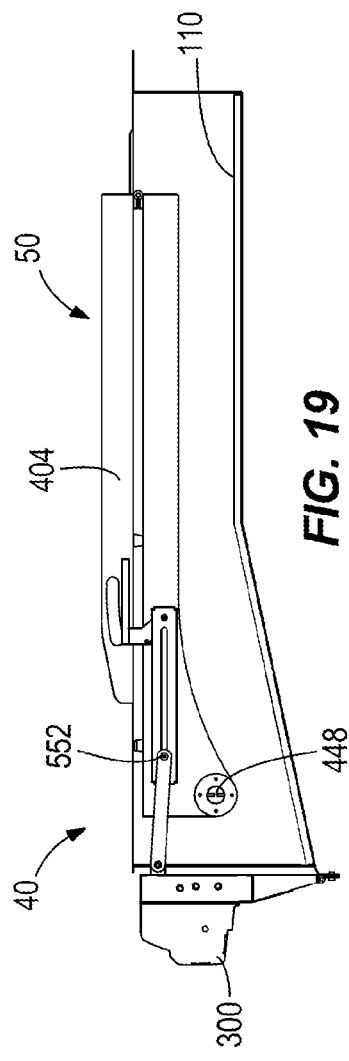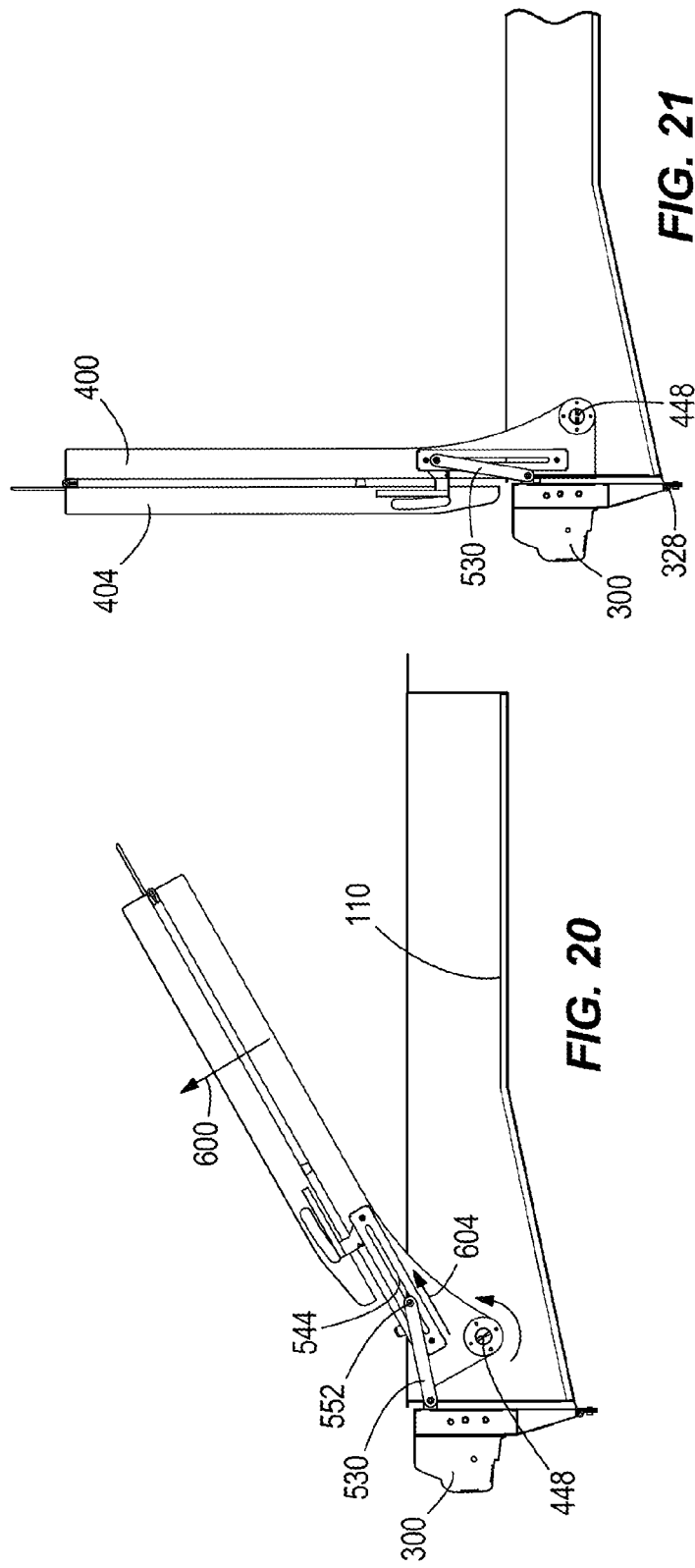

VEHICLE ACCESSIBILITY SYSTEM

CROSS-REFERENCE TO RELATED APPLICATIONS

This application claims priority to U.S. Provisional Patent Application No. 61/829,154 filed on May 30, 2013, the entire content of which is incorporated herein by reference.

FIELD OF THE INVENTION

The present invention relates to wheelchair accessible vehicles, and more particularly to an integrated vehicle accessibility system for wheelchair ingress and egress.

BACKGROUND OF THE INVENTION

Ramps are often used to permit wheelchair-bound passengers entry to and exit from a vehicle interior with minimal discomfort. Storing such ramps within the vehicle, however, typically takes up valuable space that could be used for other purposes and further impedes efficient and rapid deployment of the ramp from a stowed to an operative position.

SUMMARY OF THE INVENTION

The present invention provides a vehicle access ramp assembly for unimpeded access into and out of a vehicle having a pan for supporting a wheelchair or other mobility device. The ramp assembly folds flat within the pan when stowed, presenting a surface on which to place luggage and other cargo. The ramp assembly is pivotable from the stowed position to a vertical position and from the vertical position to a deployed position. A releasable tailgate assembly is hinged to the pan and coupled to the ramp assembly such that when deployed, the tailgate is rotated downward and positioned below the ramp, which extends continuously from a ground surface into the pan.

In one embodiment, an accessibility system for providing access into or out of a vehicle includes a pan defining a securement area. The pan includes a first end, a second end, and a support surface. A ramp assembly includes a first segment coupled to a second segment and is pivotally coupled to the pan proximate the second end. The ramp assembly is pivotable relative to the pan between a stowed position in which the ramp assembly extends toward the first end of the pan and is adjacent to the support surface, a vertical position in which the ramp assembly is generally perpendicular to the support surface, and a deployed position in which the ramp assembly extends from the vehicle. A tailgate assembly is pivotally coupled to the pan proximate the second end and operably coupled to the ramp such that when the ramp assembly is in the deployed position, the tailgate assembly is disposed below and apart from the first segment.

In one embodiment a method of providing access into or out of a vehicle includes pivoting a ramp assembly from a stowed position within the vehicle to a vertical position and unlatching a tailgate assembly from the vehicle. The method also includes concurrently pivoting the ramp assembly about a first axis to a deployed position extending from the vehicle and pivoting the tailgate assembly about a second axis parallel to and offset from the first axis.

In one embodiment an accessibility system for providing access into or out of a vehicle includes a pan defining a securement area. The pan includes a first end, a second end, and a support surface. A ramp assembly includes a first segment and a second segment hingedly coupled to the first segment. The ramp assembly is pivotally coupled to and deployable from the pan near the second end. A tailgate assembly is detachably secured and pivotally coupled to the pan such that during deployment of the ramp assembly, the ramp assembly is pivotable about a first axis and the tailgate assembly is pivotable about a second axis parallel to and offset from the first axis.

Other features and aspects of the invention will become apparent by consideration of the following detailed description and accompanying drawings.

BRIEF DESCRIPTION OF THE DRAWINGS

FIG. 15 is a perspective view of a lock member of the ramp assembly of FIG. 11 in an unlocked position.

FIG. 16 is a perspective view of the lock member of FIG. 15 in a locked position.

FIG. 17 is a perspective view of another lock member of the ramp assembly of FIG. 11 in an unlocked position.

FIG. 18 is a perspective view of the lock member of FIG. 17 in a locked position.

FIG. 19 is a schematic view of the ramp assembly in the stowed position.

FIG. 20 is a schematic view of the ramp assembly between the stowed position and the vertical position.

FIG. 21 is a schematic view of the ramp assembly in the vertical position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
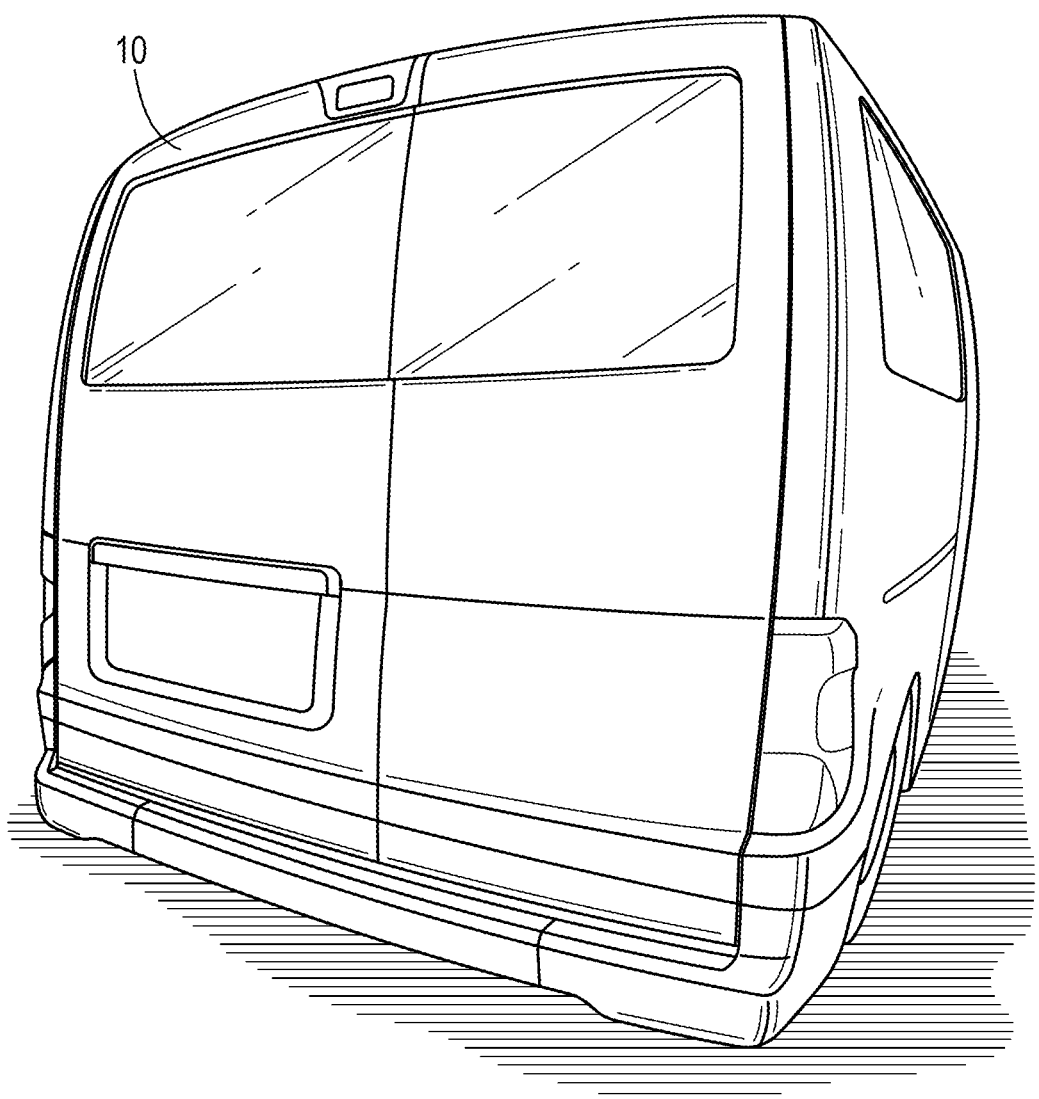
FIG. 1 is a rear perspective view of a vehicle for transporting a person in a mobility device.

FIG. 1 illustrates an exemplary vehicle 10 for transporting a wheelchair-bound individual. The illustrated vehicle 10 is a van, but the accessibility system is not so limited in application and can be used with any van, SUV, light truck, or other consumer (or commercial) vehicle permitting side or rear entry of a wheelchair. In addition, while the embodiments disclosed will be described for use with a wheelchair, the accessibility system is applicable with any type of mobility device conventionally used to provide such assistance, to include motorized scooters, carts, and other wheeled devices.

Figure 2:
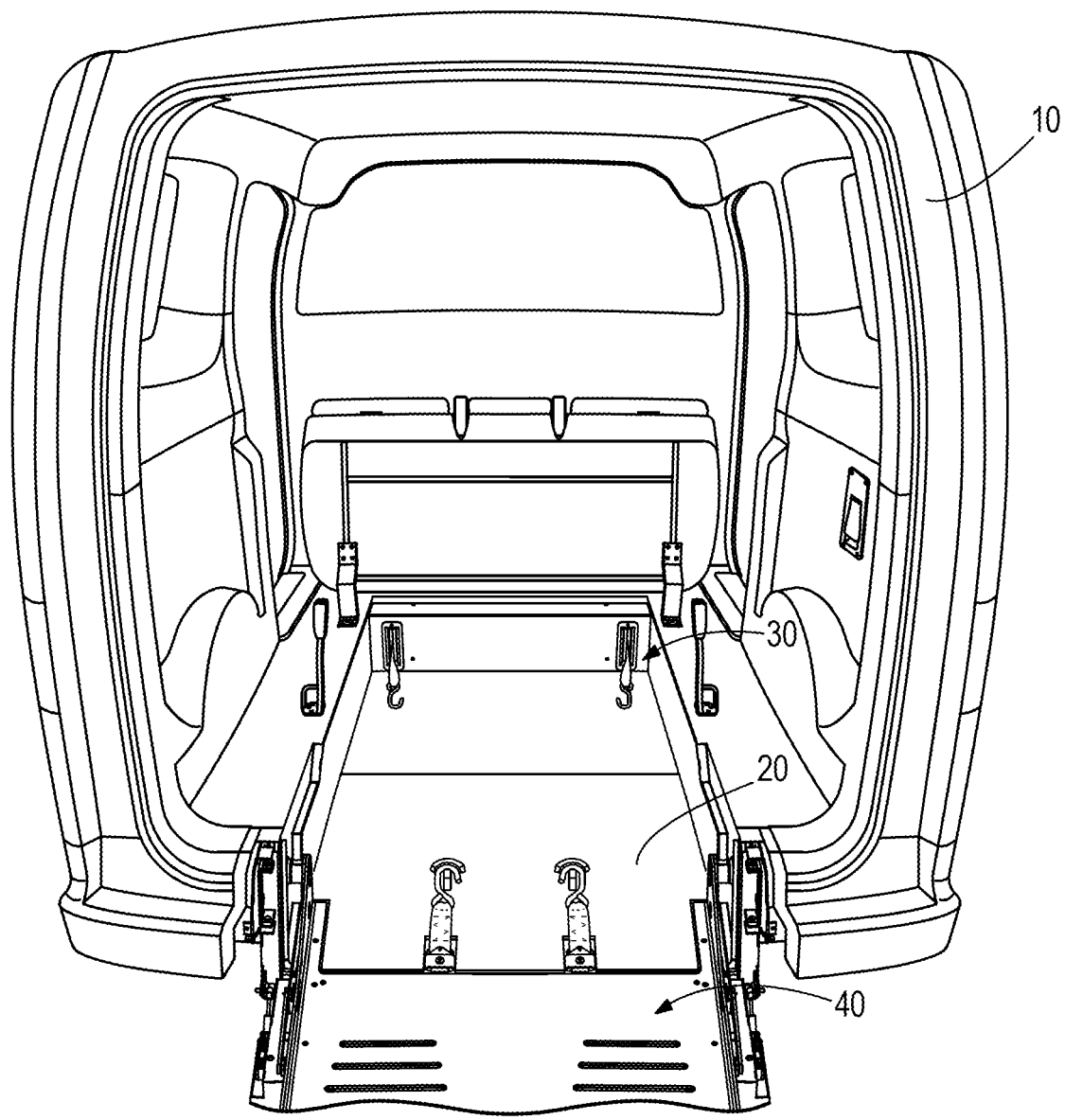
FIG. 2 is rear view of the vehicle of FIG. 1 illustrating portions of a vehicle accessibility system.

With reference to FIG. 2, the vehicle 10, as modified, includes a pan 20 for supporting the wheelchair-bound passenger (not shown), a securement system 30 for securing the wheelchair within the pan 20, and an accessibility system 40 for providing wheelchair access into the vehicle 10.

Figure 3:
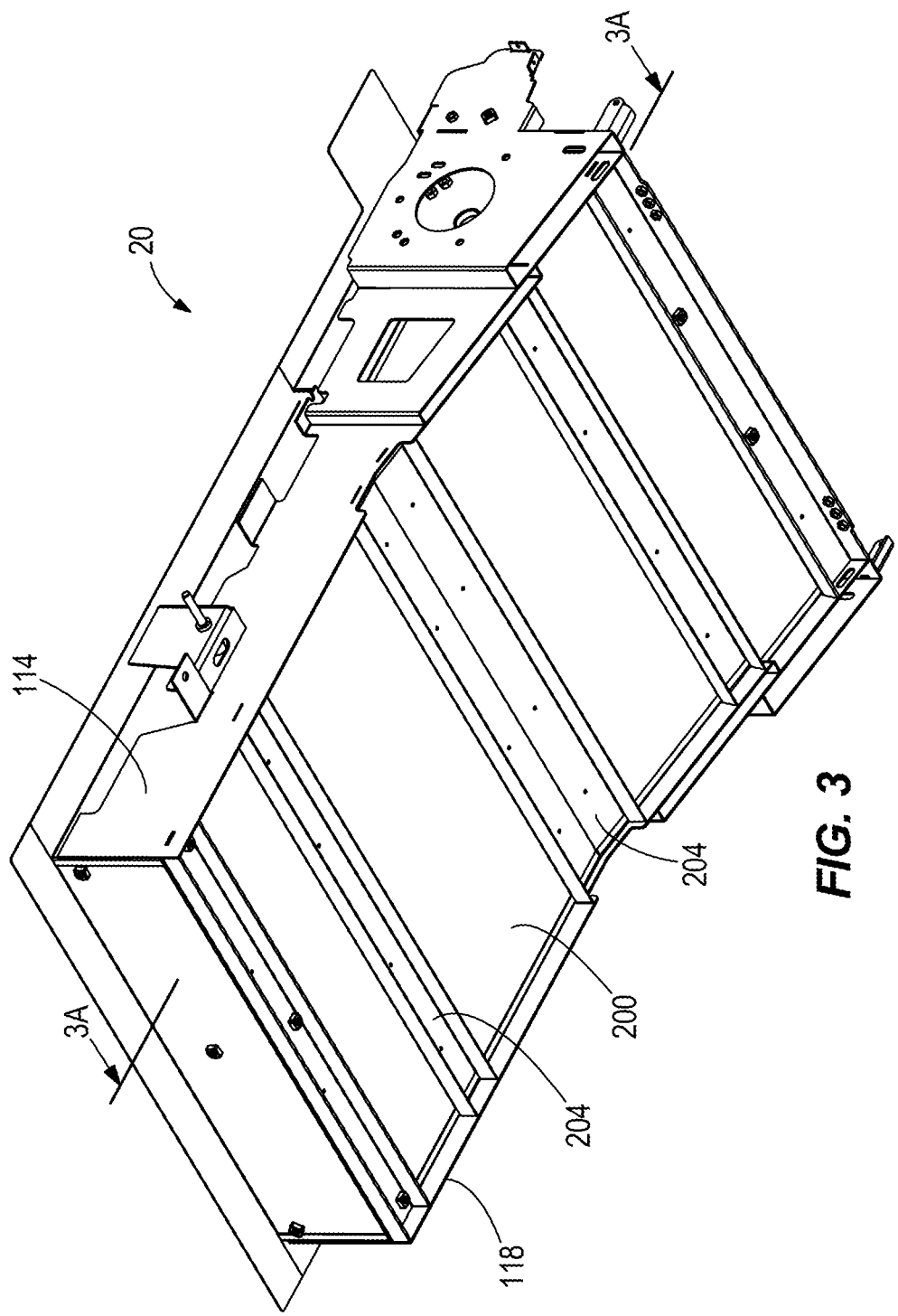
FIG. 3 is a perspective view of a pan of the accessibility system of FIG. 2
Figure 4:
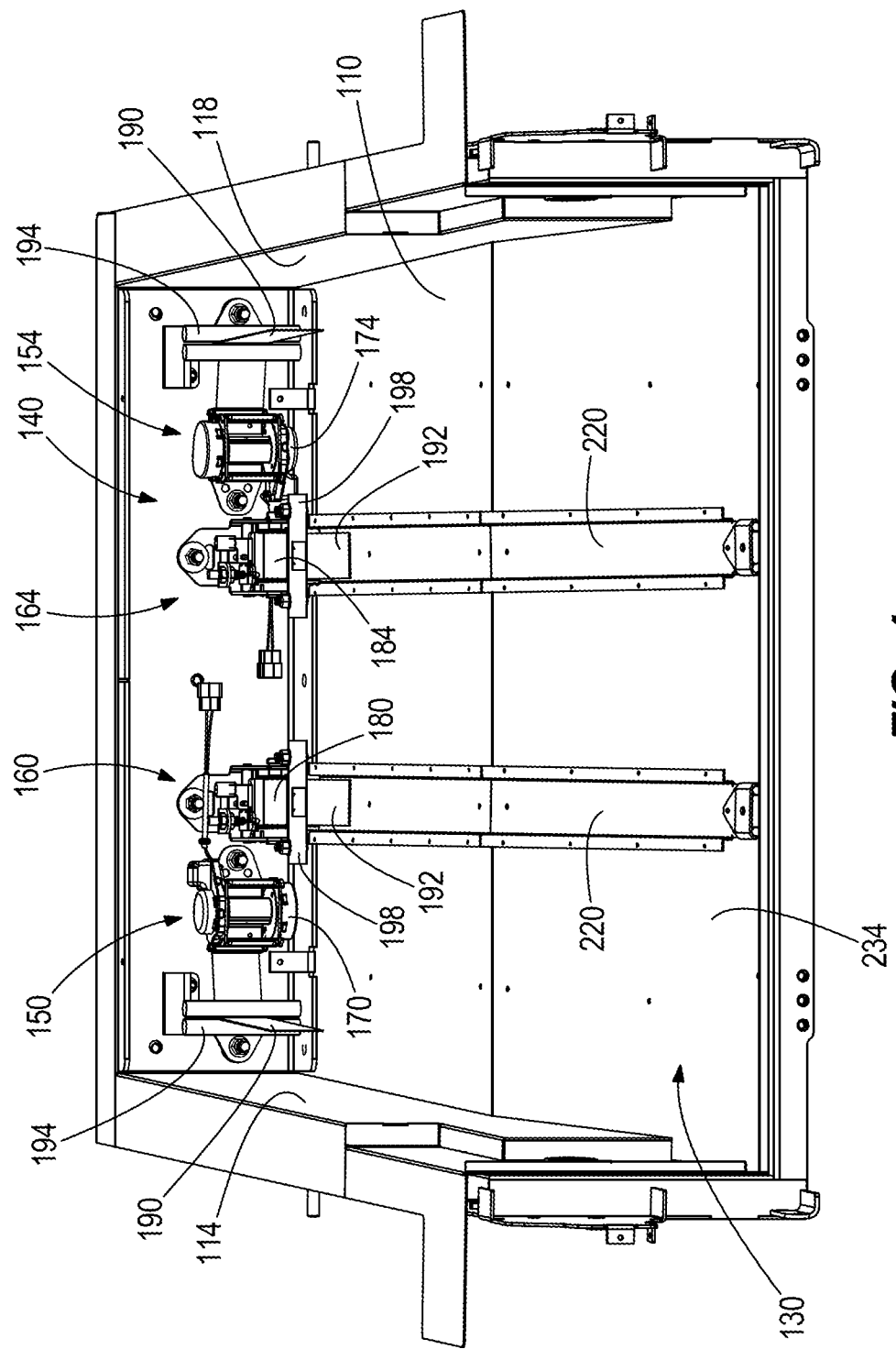
FIG. 4 is a perspective view of the pan and a retractor assembly of the accessibility system of FIG. 2, with a cover of the refractor assembly and a support floor removed.

With reference to FIGS. 2-4, the pan 20 has a support floor 110, first and second side walls 114, 118, a front panel 122 extending between the first and second walls 114, 118, and a generally open rear portion 130. As used here, terms of relative position, such as left, right, front, and rear, are referenced as viewed from the rear of the vehicle 10 (i.e., from the perspective of FIG. 2). The securement system 30 includes a retractor assembly 140 positioned behind the front panel 122 of the pan 20 comprising a pair of front restraints 150, 154 and a pair of rear restraints 160, 164, each with a retractor, a length of webbing, and a fastener fitted to an end of the webbing for attachment to the wheelchair. Specifically, a left front retractor 170 and right front retractor 174 dispense/retract the front restraints 150, 154, and a left rear retractor 180 and right rear retractor 184 dispense/retract the rear restraints 160, 164.

The front and rear retractors 170, 174, 180, 184 each include a rotationally biased spool about which the straps or webbing 190, 192 of the respective front and rear restraints 150, 154, 160, 164 is wound and unwound, a ratchet, and a locking mechanism that prevents the associated webbing from being unwound from the spool until activated. Guiding assemblies 194, 198 permit smooth extension and retraction of the respective webbing 190, 192.

Although the securement system 30 is described here as a four-point securement system, it can be configured to have any number and/or arrangement of restraints suitable for securing the wheelchair.

Figure 3A:
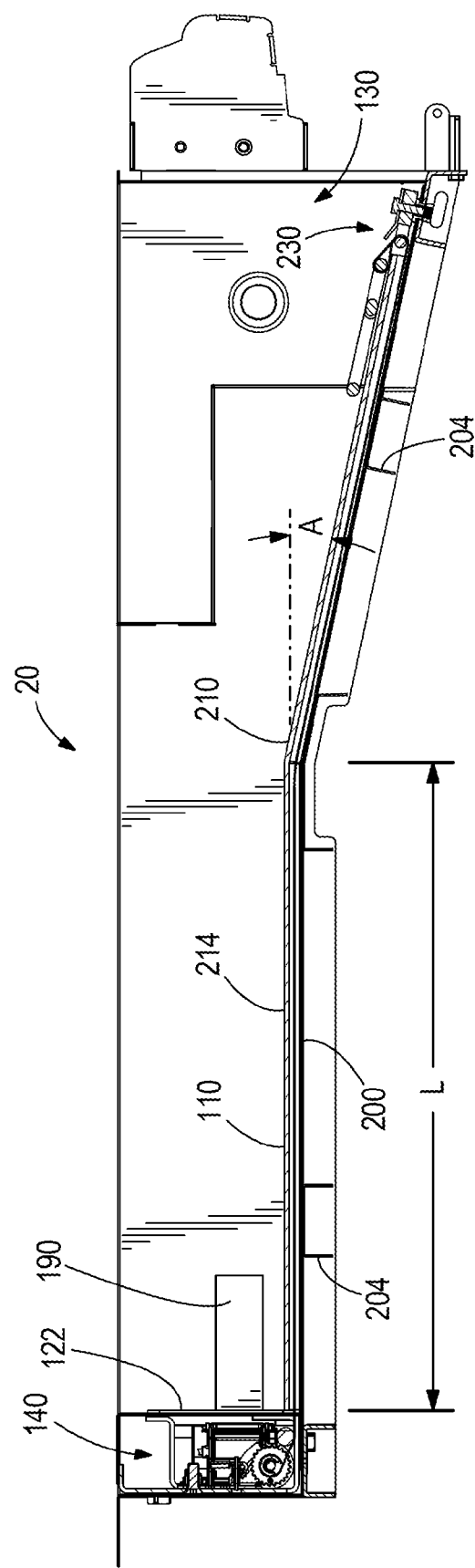
FIG. 3A is a cross-sectional view of the pan taken along line 3A-3A of FIG. 3.

Referring to FIGS. 3-4, the pan 20 has a subfloor 200 disposed underneath and adjacent to the support floor 110. Cross members 204 extend transversely between the first and second side walls 114, 118 to provide structural integrity to the subfloor 200. The subfloor 200 is angled downwardly at a distance L from the front panel 122 and at an angle A. As shown in FIG. 3A, the support floor 110 follows the general contour of the subfloor 200 such that a rear portion 210 of the support floor 110 declines from a front portion 214 and extends to the rear portion 130 of the pan 20.

Referring to FIGS. 3A and 4, the subfloor 200 includes left and right channels 220 comprising inserts recessed into the subfloor 200 that provide a depth of approximately ½" from a top surface 224 of the subfloor 200. The support floor 110 is disposed over the subfloor 200 and the channels 220 such that the channels 220 are covered by the support floor 110 when the securement system 30 is fully assembled. The channels 220 are configured to route the webbing 192 of the rear restraints 160, 164 from the retractor assembly 140 and underneath the support floor 110 so that they do not interfere with movement of a wheelchair within the pan 20. The channels 220 terminate at dispensing openings 230 through which the ends of the respective webbing 192 of each rear restraint 160, 164 pass upwardly through the support floor 110 (see also FIG. 2) for attachment to the wheelchair.

The accessibility system 40 includes a ramp assembly 50 and a tailgate assembly 60.

Figure 5:
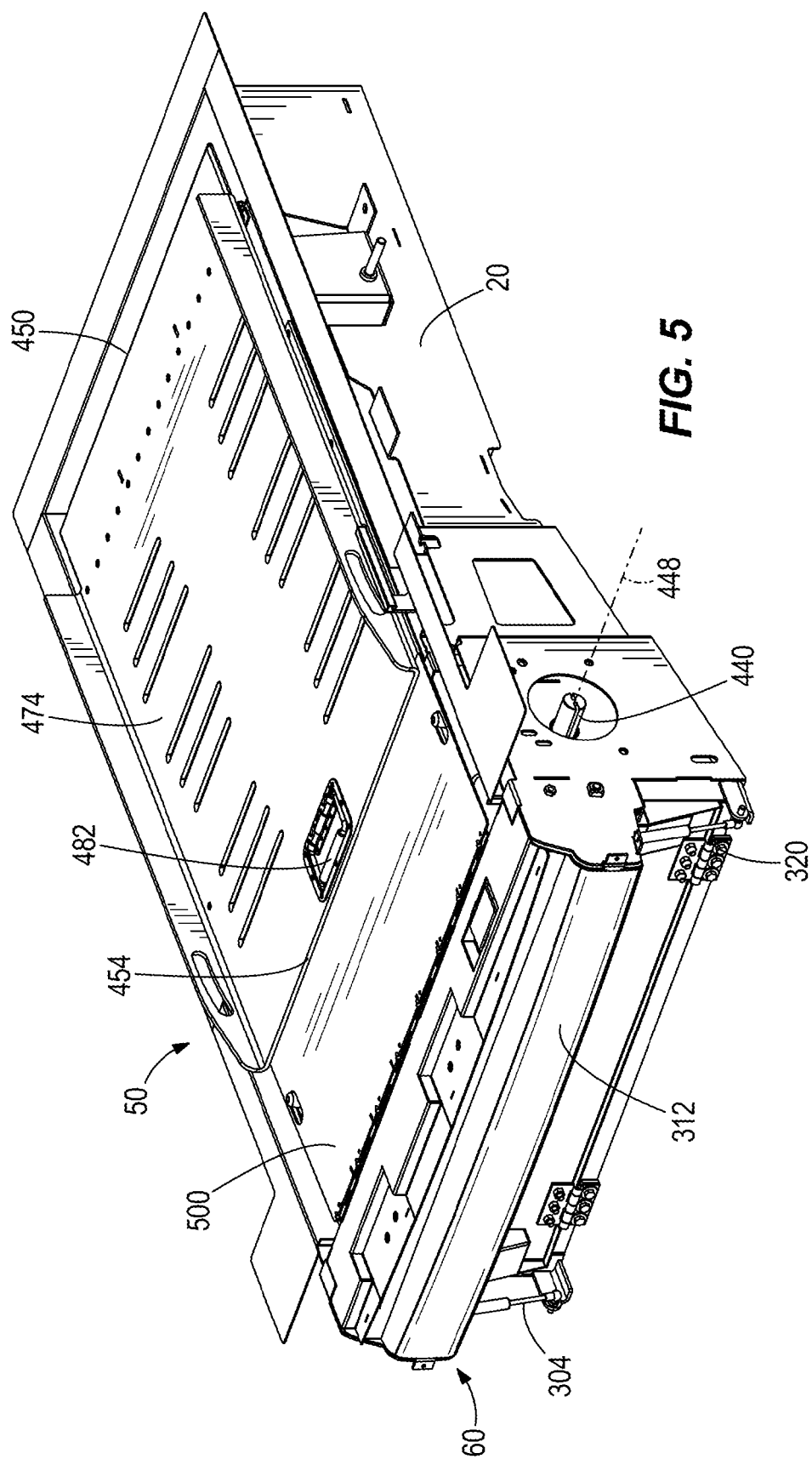
FIG. 5 is a perspective view of the accessibility system of FIG. 2 with a ramp assembly of the accessibility system in a stowed position.
Figure 6:
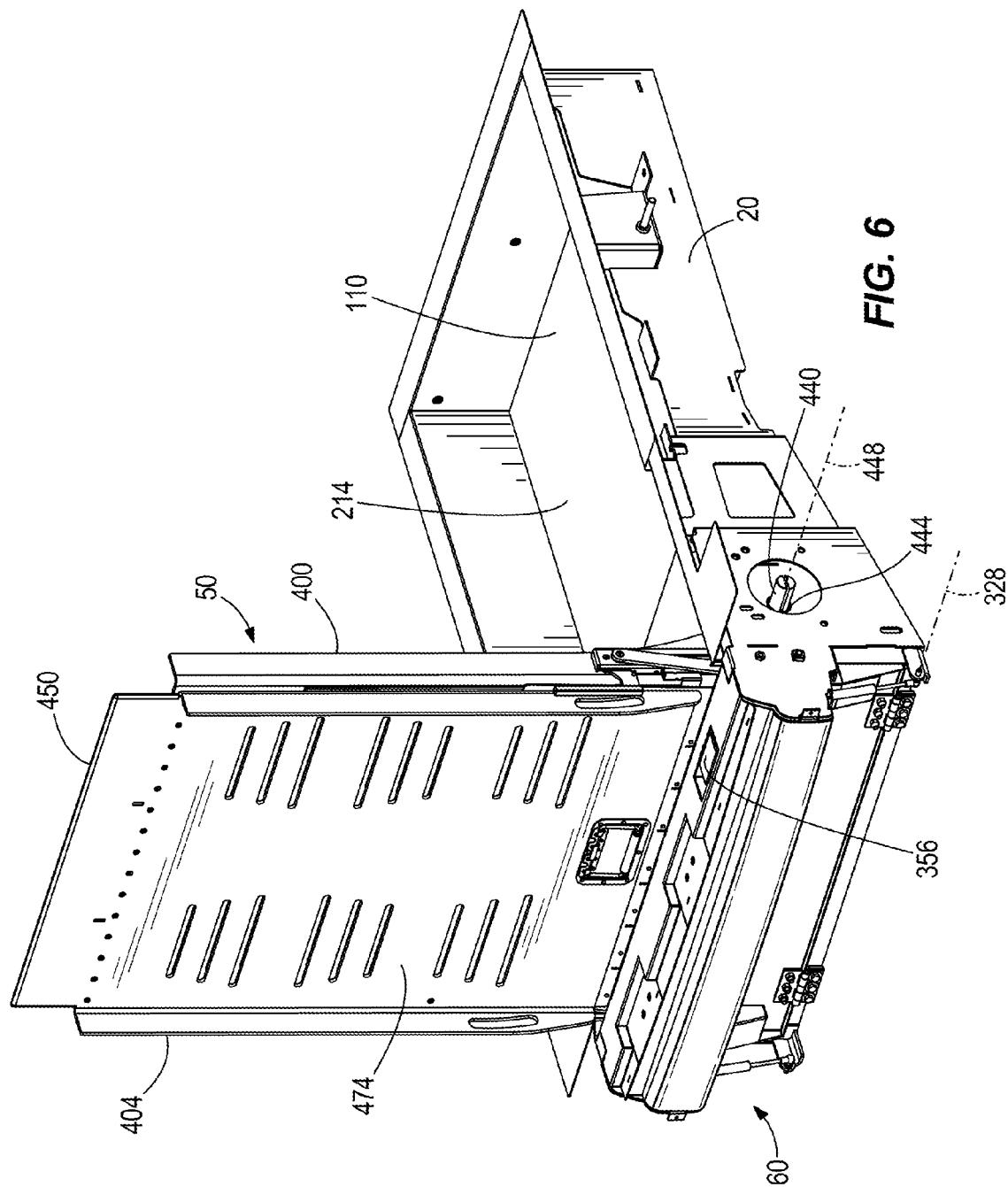
FIG. 6 is a perspective view of the accessibility system of FIG. 2 with the ramp assembly in a vertical position.
Figure 7:
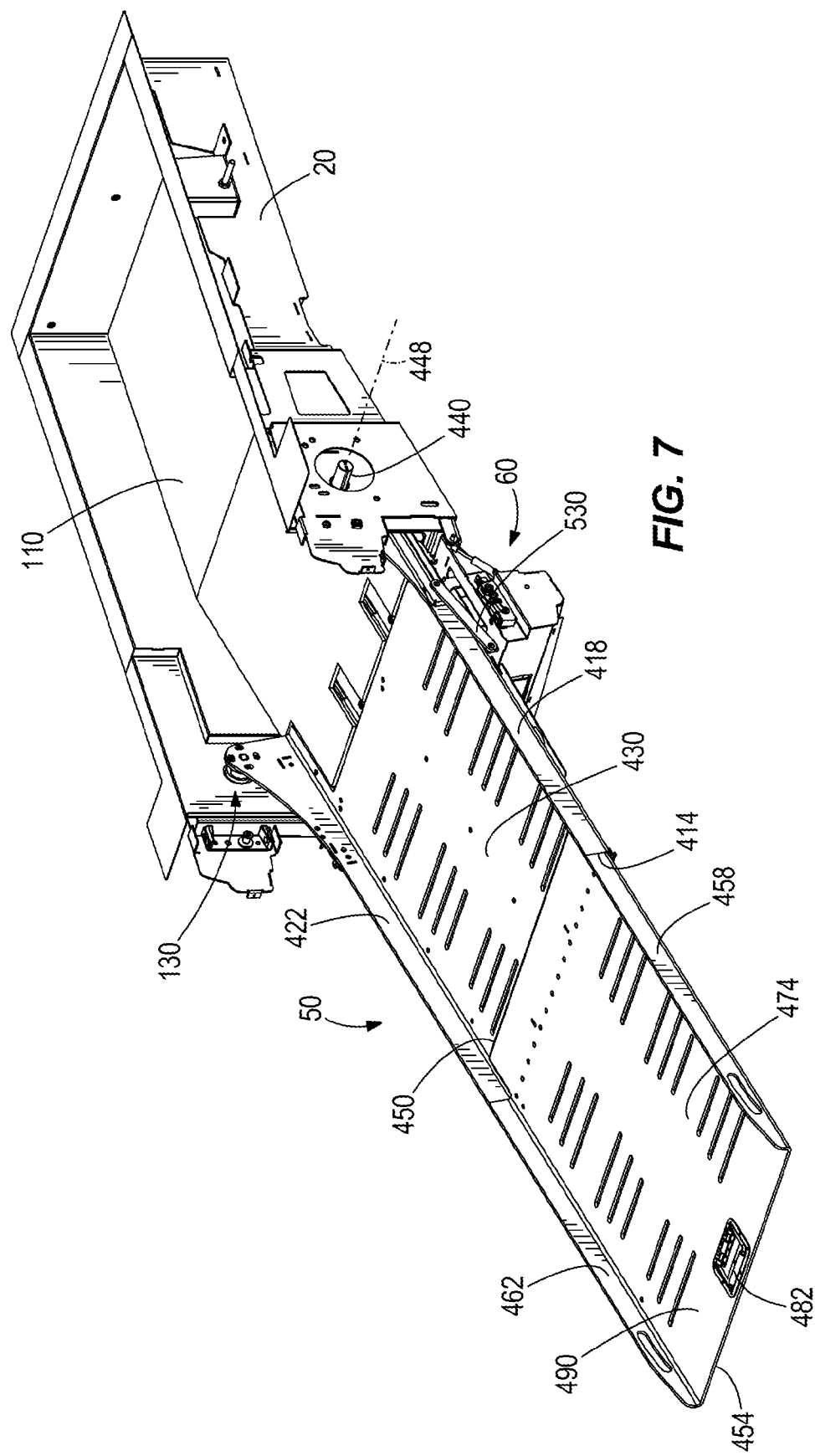
FIG. 7 is a perspective view of the accessibility system of FIG. 2 with the ramp assembly in a deployed position.

With reference to FIGS. 5-7 and for initial context, the ramp assembly 50 is movable between a stowed position, a vertical position, and a deployed position. Referring to FIG. 5, in the stowed position, the ramp assembly 50 is folded into the pan 20 to provide a surface for luggage, cargo, and other articles when the vehicle 10 is not being used to transport a passenger in a wheelchair. As shown in FIG. 6, in the vertical position the ramp assembly 50 is positioned in an upright orientation relative to the pan 20, i.e., the ramp assembly 50 is generally perpendicular to the front portion 214 of the support floor 110. This orientation provides room within the pan 20 to accommodate a wheelchair-bound passenger and serves as a transition between the stowed position of FIG. 5 and a deployed position, shown in FIG. 7. In the deployed position, the ramp assembly 50 extends from the rear portion 130 of the pan 20, permitting wheelchair access into or out of the pan 20. As will be further described, the tailgate assembly 60 is movable from a closed position (FIGS. 5 and 6) to an open position (FIG. 7) and cooperates with the ramp assembly 50 to permit a transition-free ramp surface to and from the pan 20.

Figure 8:
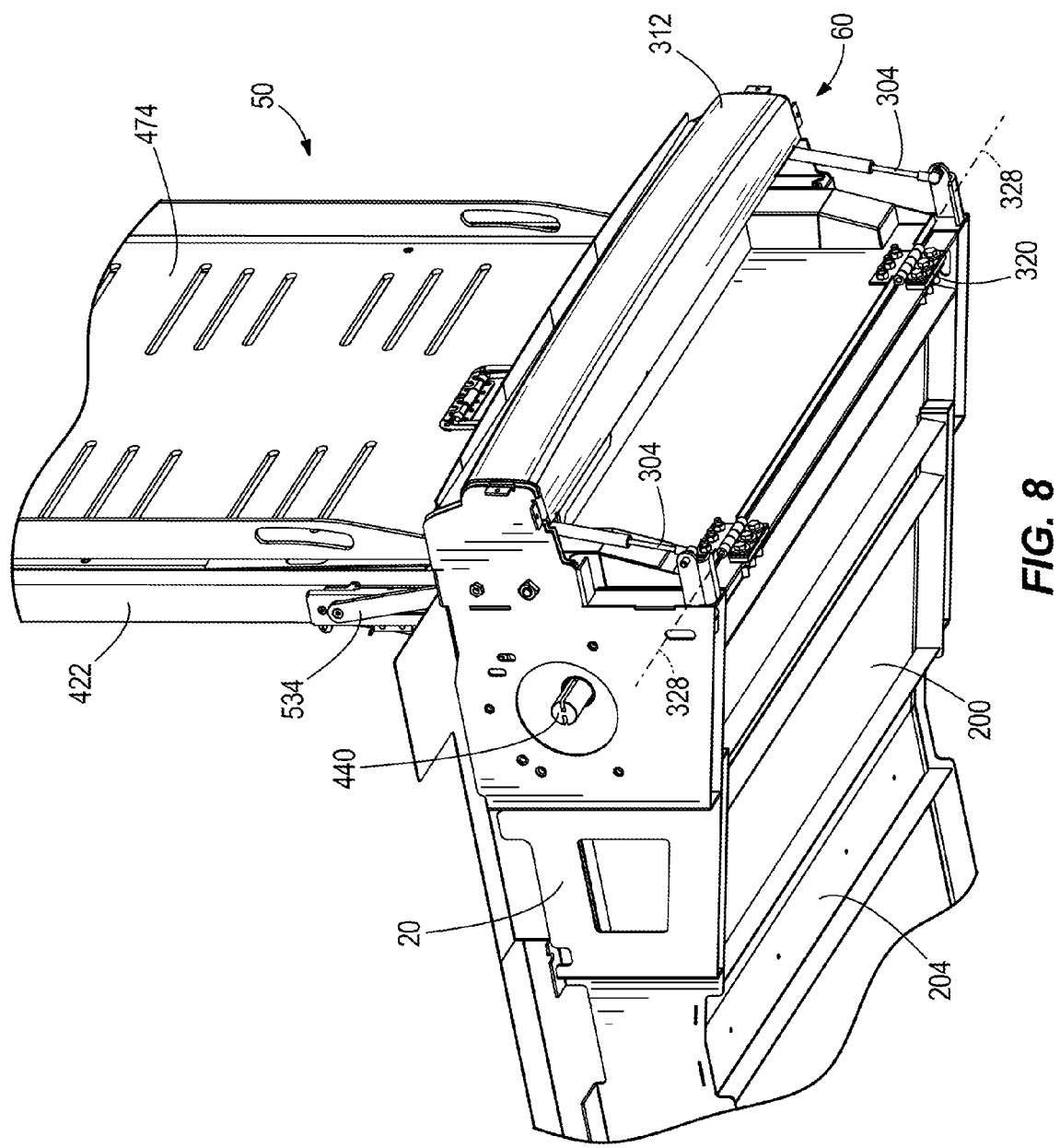
FIG. 8 is a perspective view of a tailgate assembly of the accessibility system of FIG. 2 in a closed position.
Figure 9:
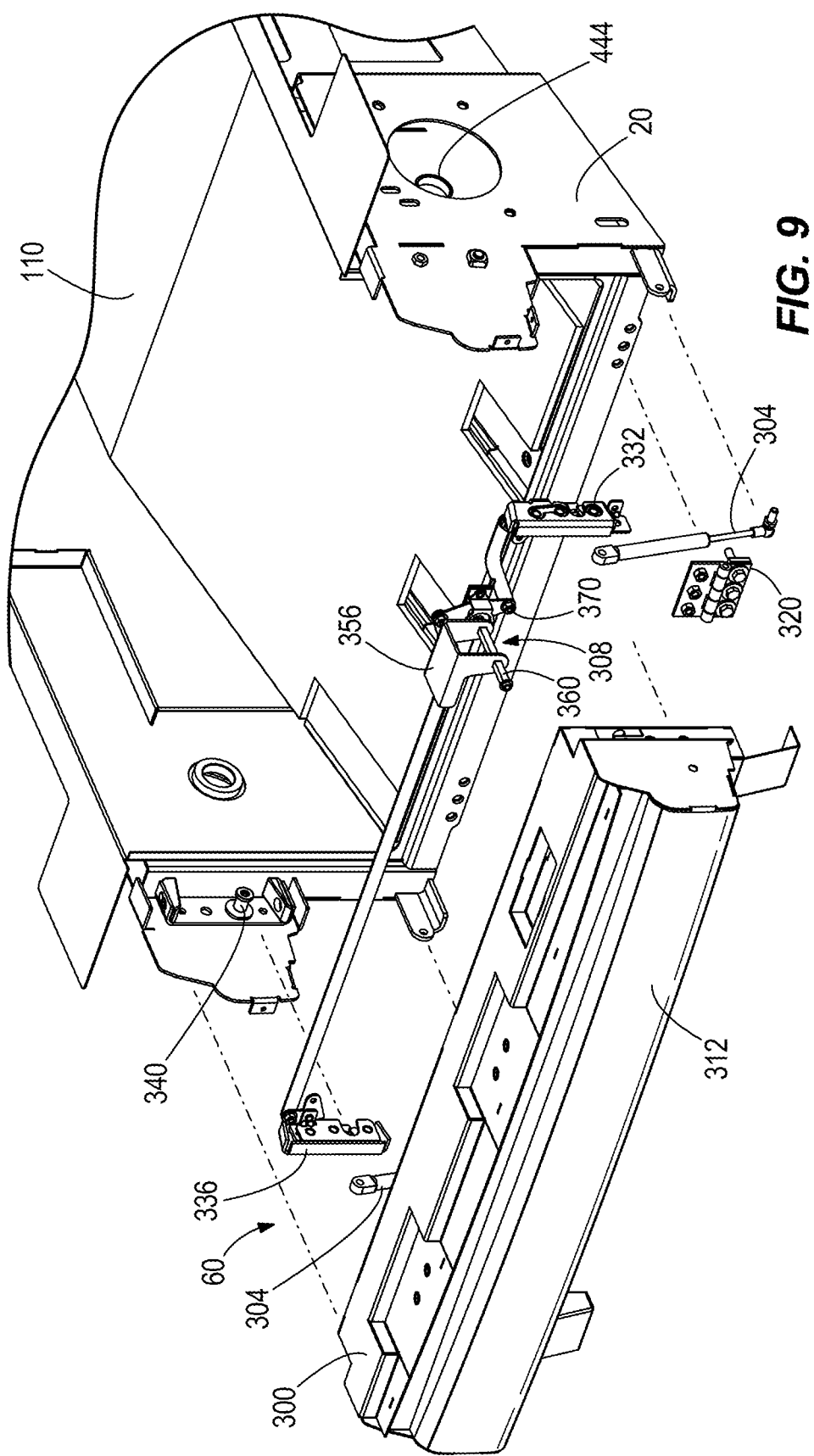
FIG. 9 is a partially exploded view of the tailgate assembly of FIG. 8.
Figure 10:
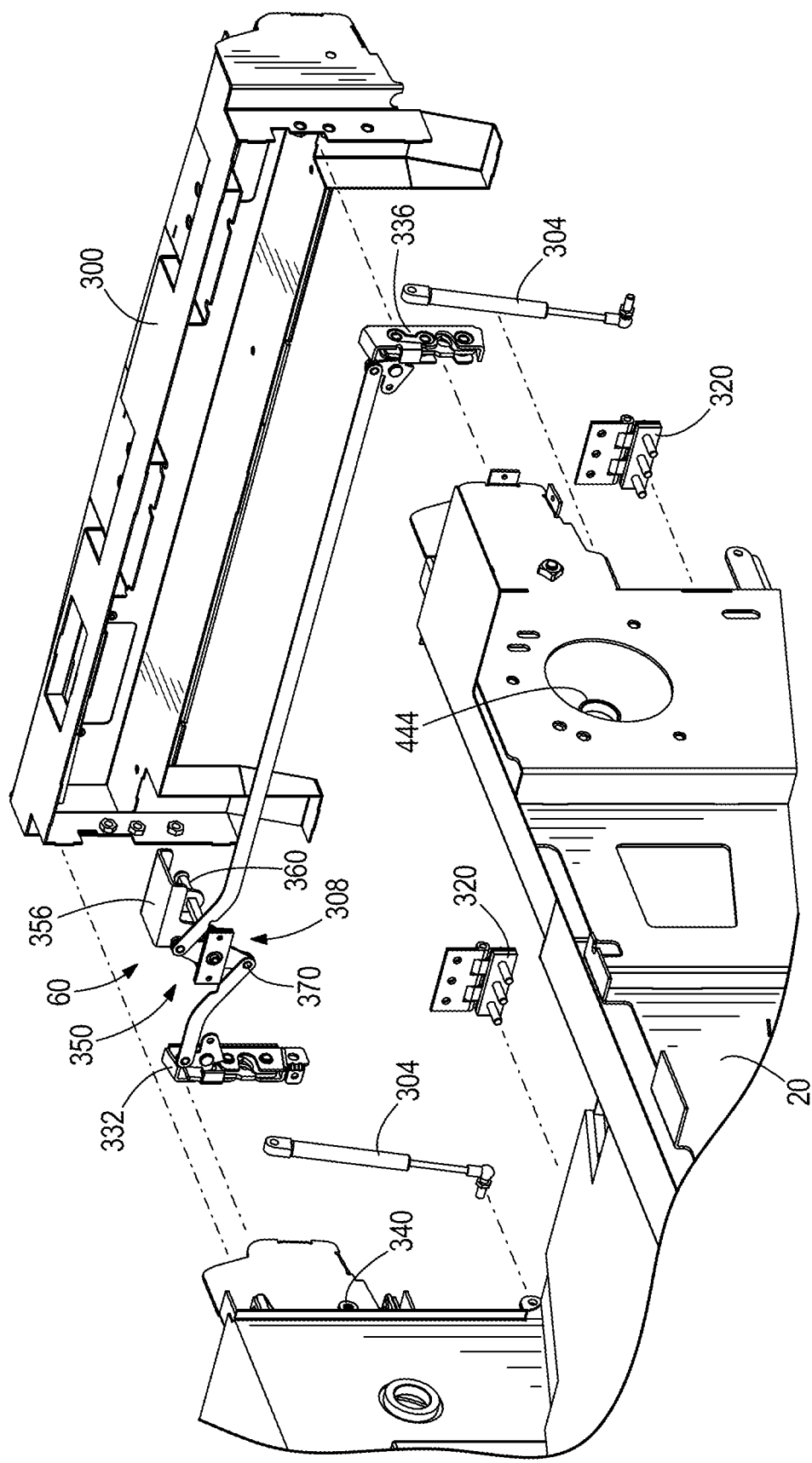
FIG. 10 is another partially exploded view of the tailgate assembly of FIG. 8.

With reference to FIGS. 8-10, the tailgate assembly 60 includes a main body 300, opposing damping members in the form of pneumatic cylinders 304, and a latching mechanism 308. The main body 300 supports a portion 312 of the vehicle bumper and is pivotally coupled to the pan 20 with hinges 320. The hinges 320 are coaxial and define a pivot axis 328 of the tailgate assembly 60. In other embodiments, the tailgate assembly 60 can be pivotally coupled to the pan 20 using any number of pins, posts, hinges, and the like. The pneumatic cylinders 304 provide a damping force to assist in smoothly raising and/or lowering the main body 300 (i.e., pivoting the main body 300 about the pivot axis 328 between the closed position and the open position).

The latching mechanism 308 includes first and second latches 332, 336 that secure the main body 300 to the pan 20 when the tailgate assembly 60 is in the closed position. The first and second latches 332, 336 can be configured as conventional automotive door, hatch, or tailgate latches. For example, in the illustrated embodiment, each of the first and second latches 332, 336 includes a pawl (not shown) engageable with respective strikers 340 located on the sides of the pan 20 in order to secure the main body 300 to the pan 20. The latching mechanism 308 further comprises a release assembly 350 operable to disengage the latches 332, 336 from the strikers 340 and permit pivotal movement of the tailgate assembly 60 about the pivot axis 328. The release assembly 350 includes an actuating lever 356 fixedly secured to an actuating bar 360 itself attached to a three-bar linkage 370. The linkage 370 mechanically couples the actuating lever 356 to each of the first and second latches 332, 336 such that rotation of the actuating lever 356 displaces the pawls to disengage them from the respective strikers 340. In an alternative embodiment, the actuating bar 360 can be actuated from a remote lever (not shown) located in another portion of the vehicle 10 using a separate mechanical linkage, e.g., a cable, extending in a concealed manner from the lever to the bar 360. In yet other embodiments, the first and second latches 332, 336 can engage/disengage from the pan 20 electromechanically or in any other suitable fashion.

With reference to FIGS. 5-6 and 11-13 the ramp assembly 50 includes a first ramp segment 400 and a second ramp segment 404. The first segment 400 has a first end 410, a second end 414, first and second sides 418, 422 extending from the first end 410 to the second end 414, and a generally planar ramp portion 426 with a top surface 430 and an opposing bottom surface 434 extending between the first and second sides 418, 422. Opposing support posts 440 are fastened to and extend laterally from the first and second sides 418, 422 at the first end 410. The support posts 440 are received within bearing apertures 444 formed within the side walls 114, 118 of the pan 20 to pivotally couple the ramp assembly 50 to the pan 20, as shown in FIGS. 5 and 6. Clock springs (not shown) or other biasing elements can be positioned to interact with the support posts 440 in order to assist in moving the ramp assembly 50 from the stowed position to the deployed position and back. The support posts 440 are coaxial and define a pivot axis 448 of the ramp assembly 50 parallel to and offset from the pivot axis 328 of the tailgate assembly 60.

Figure 11:
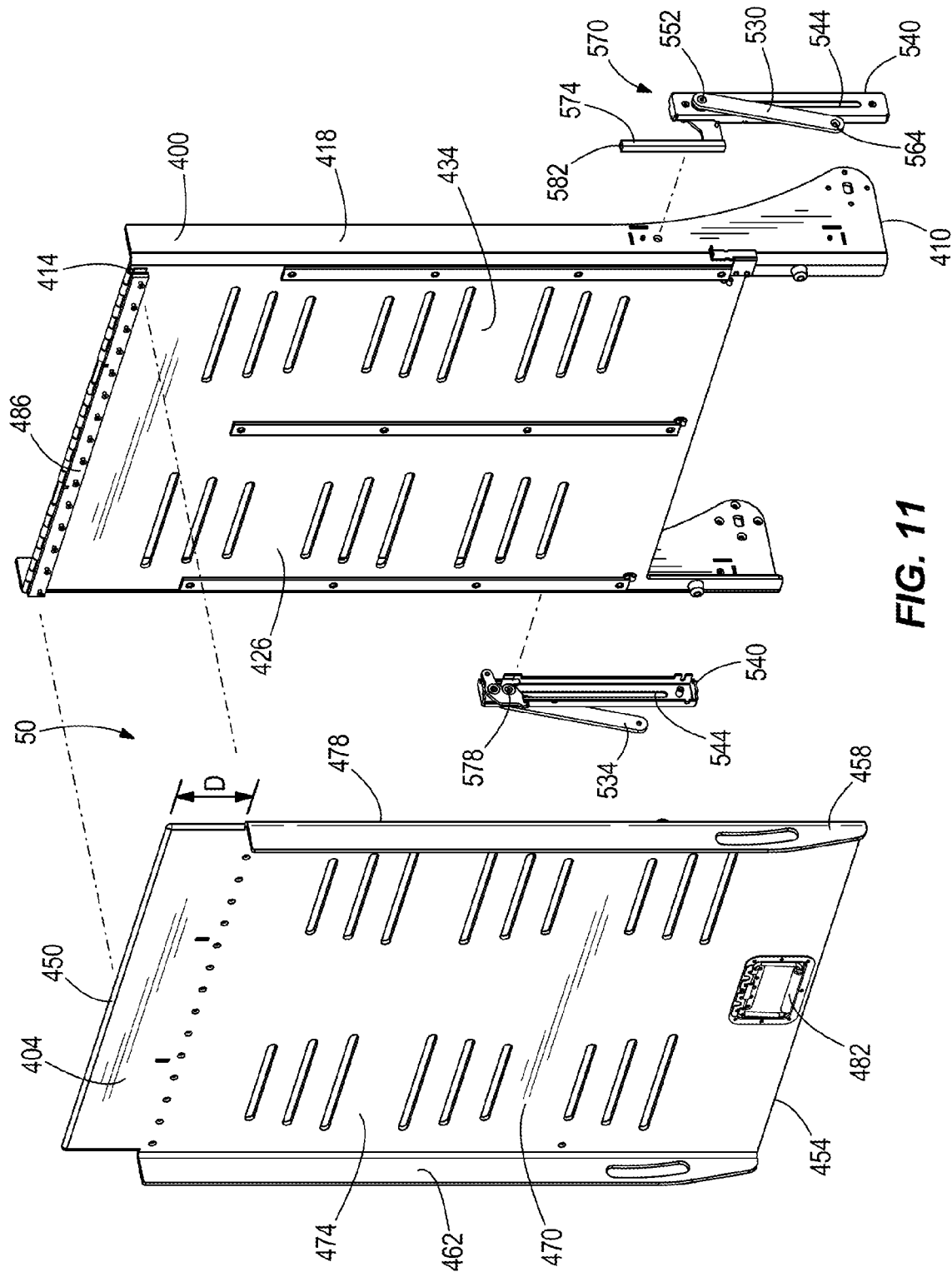
FIG. 11 is a partially exploded view of the ramp assembly of FIG. 6.
Figure 12:
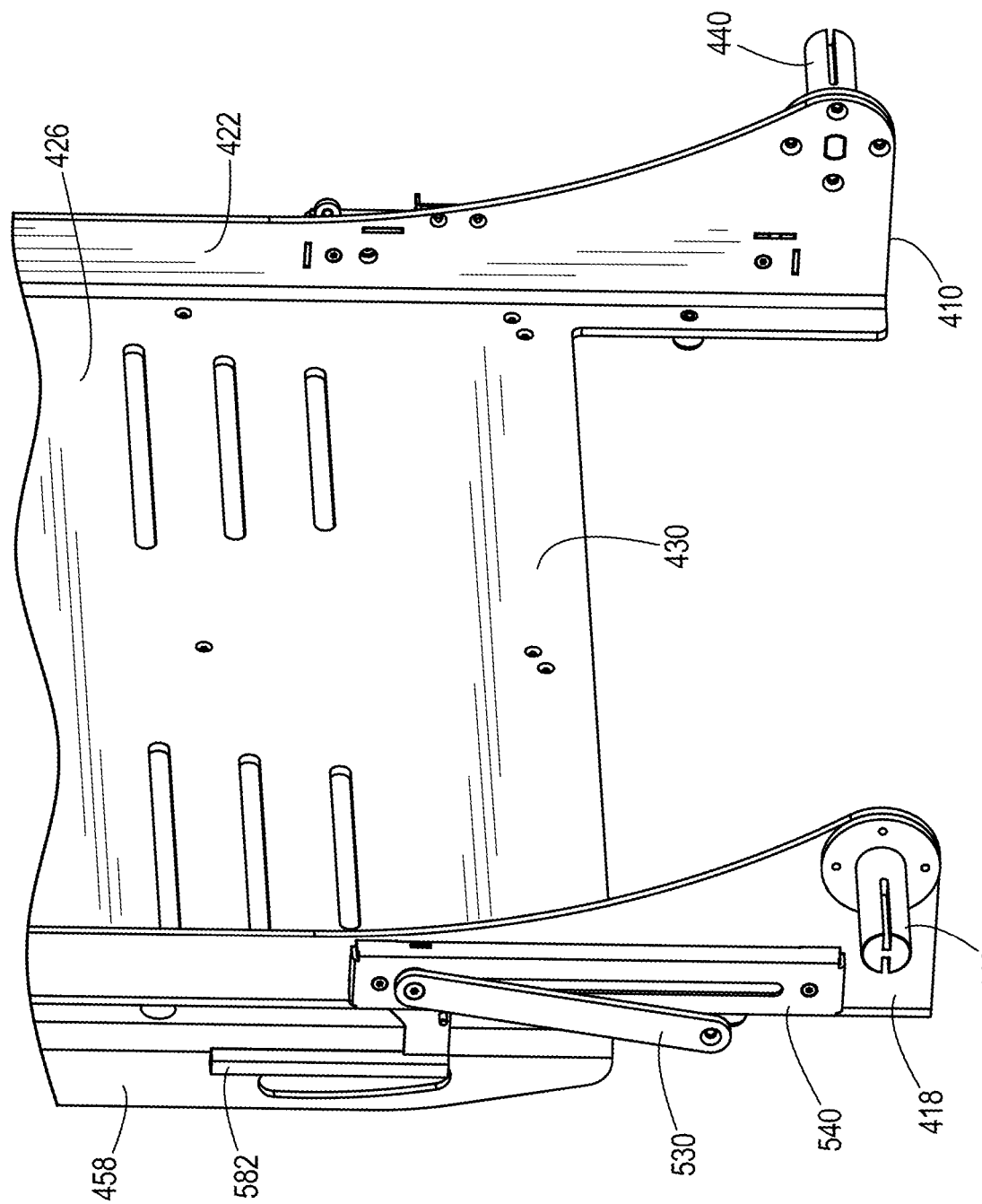
FIG. 12 is a partial perspective view of the ramp assembly of FIG. 11.

With reference to FIGS. 7 and 11, the second ramp segment 404 includes a first end 450, a second end 454, first and second sides 458, 462 extending from the first end 450 to the second end 454, and a generally planar ramp portion 470 having a top surface 474 and an opposing bottom surface 478 extending between the first and second sides 458, 462. A handle 482 is secured to the top surface 474 near the second end 454 to facilitate moving the ramp assembly 50 between the stowed, vertical, and deployed positions. A hinge 486 located a distance D from the first end 450 pivotally couples the second segment 404 to the second end 414 of the first segment 400 such that when the ramp assembly 50 is in the deployed position, the top surfaces 430, 474 cooperate to define a ramp surface 490 that provides a continuous transition between the segments 400, 404, as shown in FIG. 7.

Figure 13:
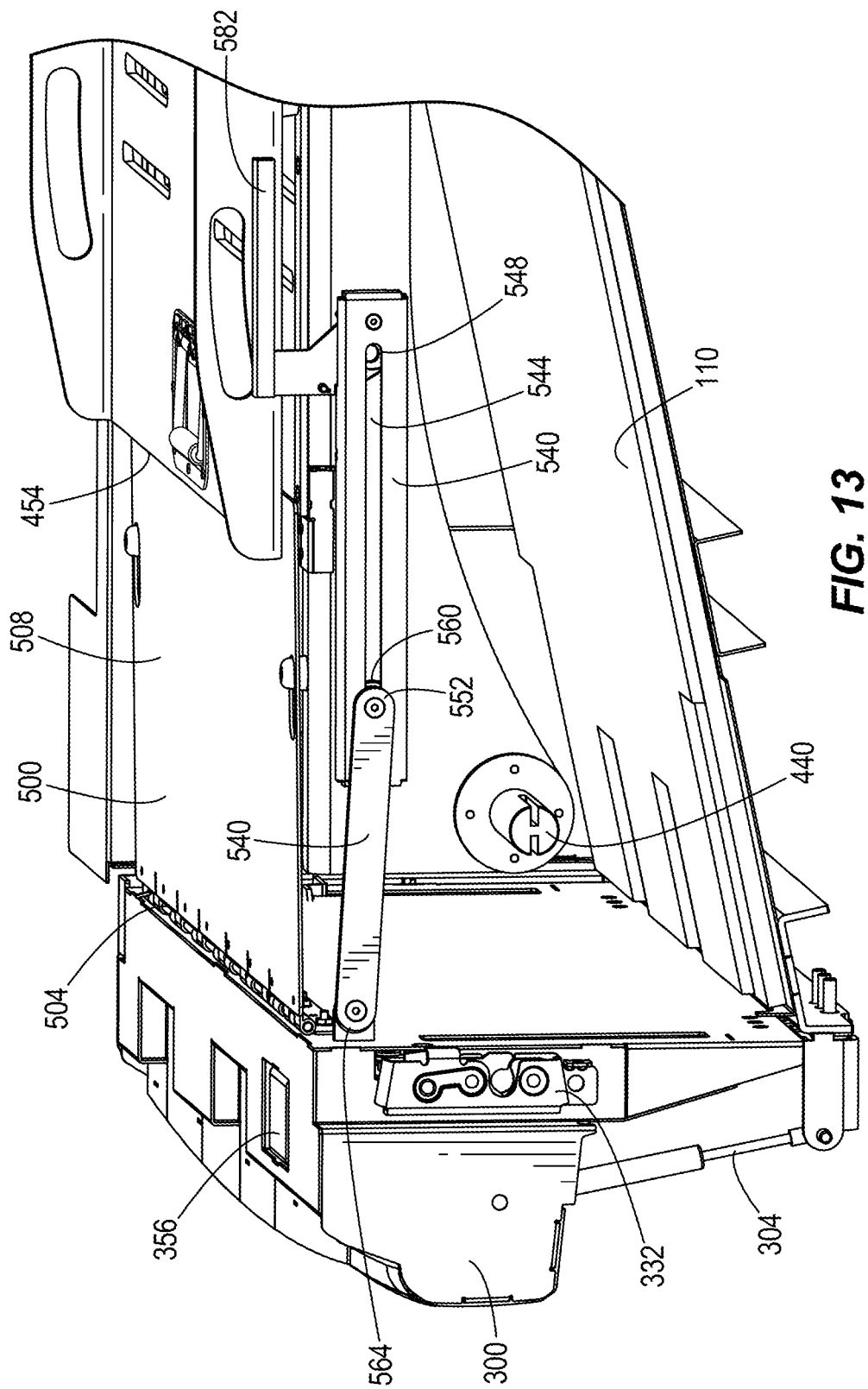
FIG. 13 is a partial cutaway view of the accessibility system of FIG. 5.

With reference to FIGS. 5 and 13, a bridge plate 500 with a first end 504 pivotally coupled to the main body 300 of the tailgate assembly 60 and a central portion 508 coupled to the first segment 400 is configured to span a gap formed between the second end 454 of the second segment 404 and the main body 300 of the tailgate assembly 60 when the ramp assembly 50 is in the stowed position. The bridge plate 500 and the top surface 474 of the second segment 404 of the ramp assembly 50 together define a flat support surface for supporting luggage or other cargo to be transported in the vehicle 10.

Figure 14:
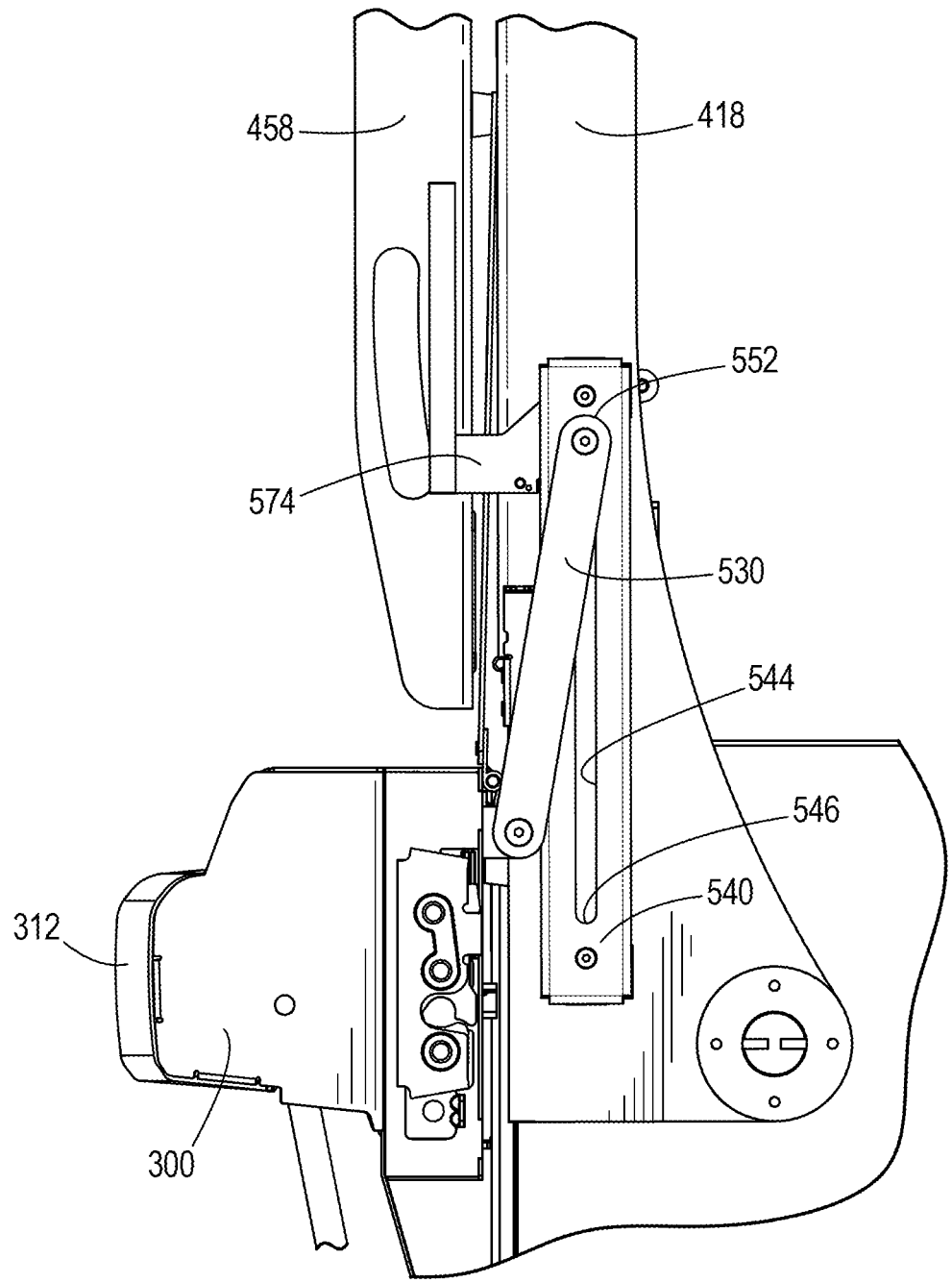
FIG. 14 is a cross-sectional view of a portion of the accessibility system of FIG. 6
Figure 22:
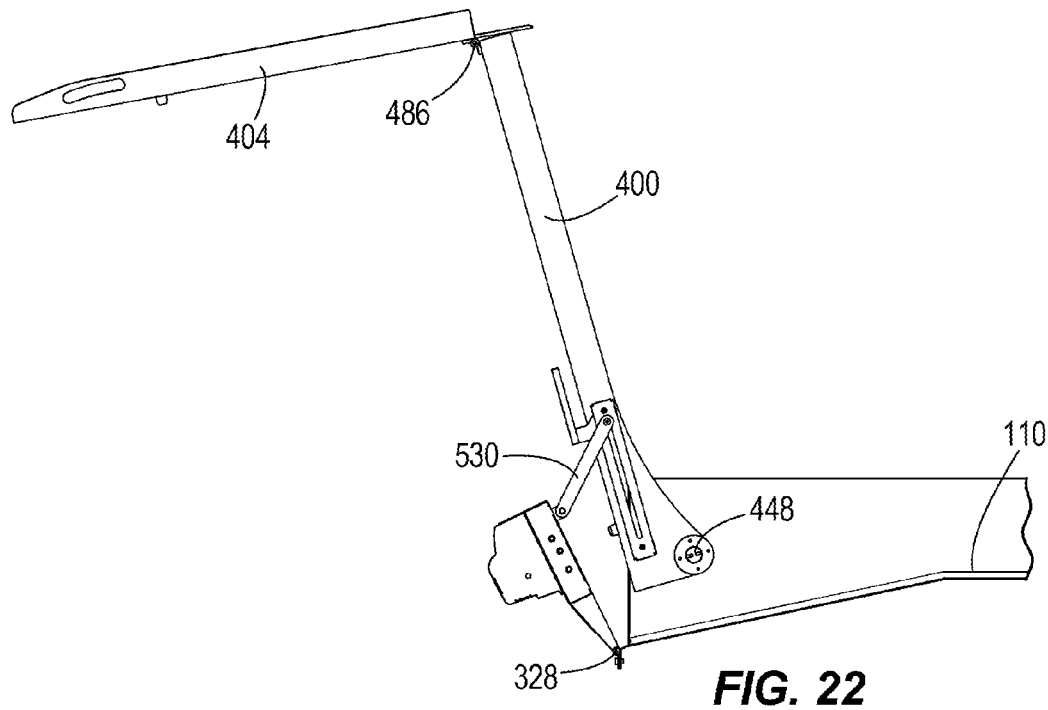
FIG. 22 is a schematic view of the ramp assembly between the vertical position and the deployed position.

With further reference to FIGS. 11-14, a first linkage 530 and a second linkage 534 couple the tailgate assembly 60 to the ramp assembly 50. First and second tracks 540 secured to the respective first and second sides 418, 422 of the first segment 404 each define respective slots 544 with a first end 546 and a second end 548. The linkages 530, 534 each have a first end 552 slidably coupled to the respective tracks 540 via a retainer 560 for movement between the slot ends 546, 548, as shown in FIGS. 13 and 14. A second end 564 of each linkage 530, 534 is pivotally coupled to the main body 300 of the tailgate assembly 60.

With further reference to FIGS. 11 and 15-18, an automatic locking mechanism 570 includes a first locking member 574 pivotally coupled to the track 540 associated with the first linkage 530 and a second locking member 578 pivotally coupled to the track 540 associated with the second linkage 534. The locking members 574, 578 are rotatable about pivot points 580 on the tracks 540 and are biased (e.g., with a spring) to a neutral position shown in FIGS. 16 and 18, respectively. The first and second locking members 574, 578 each include a hook end 584 and a contact surface 588 for rotating the members 574, 578 from the neutral position upon contact with a retainer 560 in translation toward the second end 548. Guides 592 cooperate with the hook ends 584 to secure the respective first ends 552 of the linkages 530, 534 into position, as will be further detailed below. The first locking member 574 further includes an actuating lever 582 and is operably coupled to the second locking member 578 via a cable (not shown), such as a Bowden cable. An alternative mechanical linkage, or an electronic controller and solenoid arrangement, or other suitable arrangement can be used to link the first and second locking members 574, 578. Alternatively, each of the locking members 574, 578 can have an independent actuating lever or other actuating means.

In operation, to move the ramp assembly 50 from the stowed position (FIGS. 5 and 19) to the vertical position (FIGS. 6 and 21), a user grasps the handle 482 and pulls generally in the direction of arrow 600. As a result, the ramp assembly 50 pivots about the pivot axis 448 (counter-clockwise, in the orientation of FIG. 20). Referring also to FIGS. 15-18, as the ramp assembly 50 pivots, the first end 552 of each linkage 530, 534 slides within the slot 544 of the associated track 540 from the first end 546 toward the second end 548 in the direction of arrow 604. As the ramp assembly 50 approaches the vertical position, the retainers 560 impact the contact surfaces 588 of each locking member 574, 578, displacing each member 574, 578 about the respective pivot point 580 against the biasing force. Once each retainer 560 clears each contact surface 588, the locking members 574, 578 rotate back to the neutral position and thus engage the retainers 560, preventing movement of the linkages 530, 534 within the slots 544 from the second end 548 to the first end 546. With the linkages 530, 534 so locked in place, the ramp assembly 50 is not able to rotate back to the stowed position. During movement of the ramp assembly 50 from the stowed position to the vertical position, the tailgate assembly 60 remains latched in the closed position.

Figure 23:
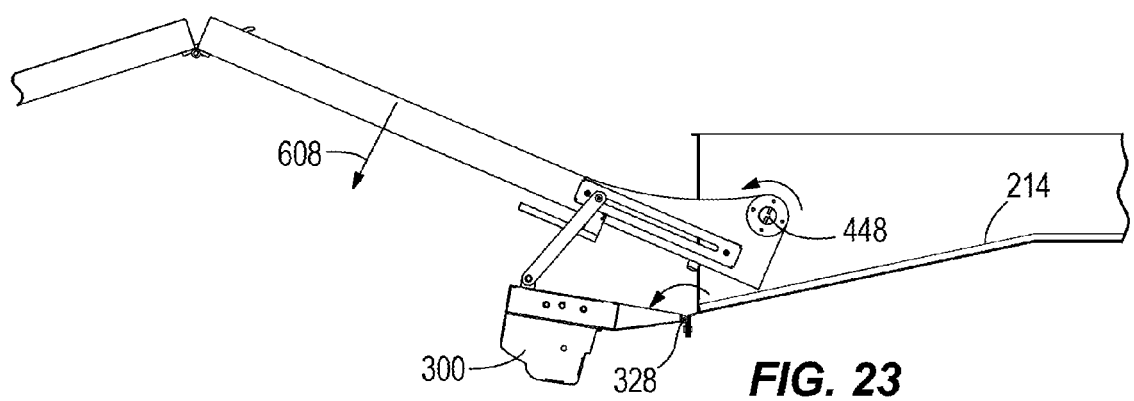
FIG. 23 is another schematic view of the ramp assembly between the vertical position and the deployed position.
Figure 24:
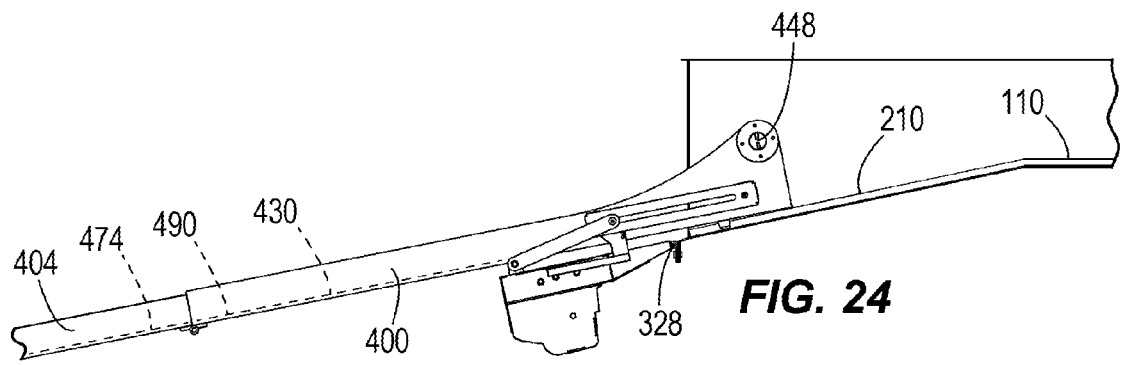
FIG. 24 is a schematic view of the ramp assembly in the deployed position.

To move the ramp assembly 50 from the vertical position (FIGS. 6 and 21) to the deployed position (FIGS. 7 and 24), the user pulls on the actuating lever 356 to disengage the latches 332, 336 of the tailgate assembly 60. With the latches 332, 336 disengaged, the tailgate assembly 60 and the ramp assembly 50 can each pivot about their respective pivot axes 328, 448 (counter-clockwise, in the orientation of FIG. 23) as the user extends the ramp assembly 50 as shown by arrow 608. When the ramp assembly 50 reaches the deployed position and the second segment 404 is contact with a ground surface, the top surfaces 430, 474 of the first and second segments 400, 404 cooperate to define the ramp surface 490, which permits wheelchair access into or out of the pan 20 (FIGS. 7 and 24). Because the tailgate assembly 60 is now located underneath of the ramp assembly 50, the ramp surface 490 provides a continuous transition between the ground surface and the support floor 110 of the pan 20. In the deployed position, a wheelchair occupant can enter and exit the vehicle 10.

To return the ramp assembly 50 from the deployed position, the user lifts up on the handle 482 of the second segment 404 and pivots the ramp assembly 50 about the axis 448 toward the vertical position, concurrently folding the segments 400, 404 about the hinge 486. As the ramp assembly 50 pivots, the linkages 530, 534 pull generally upward on the main body 300 of the tailgate assembly 60 in a direction generally opposite to that of arrow 608. When the tailgate assembly 60 reaches the closed position, which coincides with the vertical position of the ramp assembly 50, the latches 332, 336 engage the strikers 340 on the pan 20 to automatically lock the tailgate assembly 60 to the pan 20. The linkages 530, 534, which remain locked in place, prevent inadvertent movement of the ramp assembly 50 to the stowed position. The ramp assembly 50 is therefore maintained in the vertical position during transportation of a wheelchair occupant.

To move the ramp assembly 50 from the vertical position to the stowed position, the user pulls the actuating lever 582 from the position illustrated in FIG. 16 to the position illustrated in FIG. 15 to rotate the locking member 574 from the neutral position. Because the first and second locking members 574, 578 are operationally coupled, rotation of the lever 582 simultaneously displaces both members 574, 578 to release the linkages 530 534, freeing them to slide within the slots 544 of the respective tracks 540. Once the first ends 552 of the linkages 530, 534 are free of the locking members 574, 578, the user can pivot the ramp assembly 50 about the pivot axis 448 to the stowed position. Concurrently, the bridge plate 500 rotates into position and with the top surface 474 of the second segment 404 presents a flat surface capable of supporting luggage or other cargo.

Various features and benefits of the invention are included in the following claims.

What is claimed is:

1. An accessibility system for providing access into or out of a vehicle, the accessibility system comprising:
   a pan defining a securement area, the pan including a first end, a second end, and a support surface;
   a ramp assembly including a first segment coupled to a second segment, the ramp assembly pivotally coupled to the pan proximate the second end and pivotable relative to the pan between a stowed position in which the ramp assembly extends toward the first end of the pan and is adjacent to the support surface, a vertical position in which the ramp assembly is generally perpendicular to the support surface, and a deployed position in which the ramp assembly extends from the vehicle;
   a tailgate assembly pivotally coupled to the pan proximate the second end and operably coupled to the ramp assembly such that when the ramp assembly is in the deployed position, the tailgate assembly is disposed below and apart from the first segment; and
   a linkage having a first end pivotally coupled to the tailgate assembly and a second end slidably coupled to the ramp assembly,
   wherein the second end of the linkage is received within a track fixed to the first segment of the ramp assembly and is slidable along the track when the ramp assembly is moved between the stowed position and the vertical position, and
   wherein the second end of the linkage is locked in a predetermined position within the track when the ramp assembly is moved between the vertical position and the deployed position.

2. The accessibility system of claim 1, wherein the ramp assembly is pivotable about a first axis and the tailgate assembly is pivotable about a second axis parallel to and offset from the first axis.

3. The accessibility system of claim 2, further including a damping member coupled to the tailgate assembly, wherein the damping member dampens pivoting of the tailgate assembly about the second axis.

4. The accessibility system of claim 1, further comprising a lock member engageable with the second end of the linkage to automatically lock the second end of the linkage upon reaching the predetermined position.

5. The accessibility system of claim 1, further comprising a latch configured to secure the tailgate assembly to the pan.

6. The accessibility system of claim 5, further comprising an actuator coupled to the latch, wherein the actuator is operable to disengage the latch to permit the tailgate assembly to pivot about a first axis parallel to and offset from a second axis about which the ramp assembly pivots.

7. The accessibility system of claim 1, wherein the tailgate assembly is configured to support a portion of the vehicle bumper.

8. An accessibility system for providing access into or out of a vehicle, the accessibility system comprising:
   a pan defining a securement area, the pan including a first end, a second end, and a support surface;
   a ramp assembly including
     a first segment, and
     a second segment hingedly coupled to the first segment, wherein the ramp assembly is pivotally coupled to and deployable from the pan near the second end;
   a tailgate assembly detachably secured and pivotally coupled to the pan such that during deployment of the ramp assembly, the ramp assembly is pivotable about a first axis and the tailgate assembly is pivotable about a second axis parallel to and offset from the first axis; and
   a plate having a first portion pivotally coupled to the tailgate assembly and a second portion slidably coupled to the ramp assembly, wherein the plate spans a gap defined between the ramp assembly and the tailgate assembly when the ramp assembly is in a stowed position in which the ramp assembly extends toward the first end of the pan and is adjacent to the support surface.

9. The accessibility system of claim 8, further comprising a linkage having a first end pivotally coupled to the tailgate assembly and a second end slidable within a track fixed to the ramp assembly.

10. The accessibility system of claim 8, further comprising a latch configured to detach the tailgate assembly from the pan for rotation about the second axis.

* * * * *